US012261914B2

(12) United States Patent
Psiaki et al.

(10) Patent No.: US 12,261,914 B2
(45) Date of Patent: *Mar. 25, 2025

(54) MIXED PEER-TO-PEER MESH AND FORWARDING SYSTEM

(71) Applicant: Topia Interactive, Inc., Indio, CA (US)

(72) Inventors: Chris Psiaki, Indio, CA (US); Daniel Liebeskind, Indio, CA (US)

(73) Assignee: Topia Interactive, Inc., Indio, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 18/453,756

(22) Filed: Aug. 22, 2023

(65) Prior Publication Data

US 2023/0396679 A1    Dec. 7, 2023

Related U.S. Application Data

(63) Continuation of application No. 18/077,984, filed on Dec. 8, 2022, now Pat. No. 11,758,003.

(60) Provisional application No. 63/398,485, filed on Aug. 16, 2022, provisional application No. 63/391,652, filed on Jul. 22, 2022, provisional application No. 63/288,435, filed on Dec. 10, 2021.

(51) Int. Cl.
| | |
|---|---|
| *H04L 65/1069* | (2022.01) |
| *H04L 65/1108* | (2022.01) |
| *H04L 65/75* | (2022.01) |
| *H04L 65/752* | (2022.01) |
| *H04L 67/104* | (2022.01) |
| *H04L 67/1087* | (2022.01) |
| *H04L 67/141* | (2022.01) |

(52) U.S. Cl.
CPC ........ *H04L 67/141* (2013.01); *H04L 65/1069* (2013.01); *H04L 65/1108* (2022.05); *H04L 65/752* (2022.05); *H04L 65/762* (2022.05); *H04L 67/104* (2013.01); *H04L 67/1091* (2013.01); *H04L 65/764* (2022.05); *H04L 65/765* (2022.05)

(58) Field of Classification Search
CPC ... H04L 67/752; H04L 67/762; H04L 65/764; H04L 65/765; H04L 67/104
USPC ........................ 709/220, 224, 226, 227, 228
See application file for complete search history.

(56) References Cited

U.S. PATENT DOCUMENTS

| | | | |
|---|---|---|---|
| 9,549,152 B1 * | 1/2017 | Nayyar | H04L 65/403 |
| 9,641,566 B1 * | 5/2017 | Hiremath | H04N 21/4334 |
| 10,893,087 B1 * | 1/2021 | Munoz | H04L 51/58 |

(Continued)

FOREIGN PATENT DOCUMENTS

CA        3045125 C   *   7/2020   ............. H04N 19/12

*Primary Examiner* — Khanh Q Dinh
(74) *Attorney, Agent, or Firm* — Pillsbury Winthrop Shaw Pittman, LLP

(57) ABSTRACT

A process that includes establishing, with a first client computing device, a first peer-to-peer connection with a second client computing device. The process further includes determining, with the first client computing device, that a first media stream provided by the first client computing device satisfies at least one selective forwarding unit streaming condition, and providing, with the first client computing device and in response to the first media stream satisfying the at least one selective forwarding unit streaming condition, the first media stream to the second client computing device via a selective forwarding unit.

20 Claims, 15 Drawing Sheets

(56) References Cited

U.S. PATENT DOCUMENTS

| | | | |
|---|---|---|---|
| 11,758,003 B2 * | 9/2023 | Psiaki | H04L 65/612 |
| | | | 709/231 |
| 11,800,177 B1 * | 10/2023 | Shaw | H04N 21/43072 |
| 2010/0095317 A1 * | 4/2010 | Toebes | H04N 21/466 |
| | | | 725/9 |
| 2013/0103850 A1 * | 4/2013 | Kohli | H04L 65/764 |
| | | | 709/231 |
| 2017/0026427 A1 * | 1/2017 | Vuong | H04L 67/104 |
| 2019/0260814 A1 * | 8/2019 | Amini | H04L 43/12 |
| 2019/0261243 A1 * | 8/2019 | Amini | G08B 3/10 |
| 2023/0115611 A1 * | 4/2023 | Sternlicht | A61K 31/167 |
| | | | 514/356 |
| 2023/0262234 A1 * | 8/2023 | Amini | H04L 43/0858 |
| | | | 709/219 |

* cited by examiner

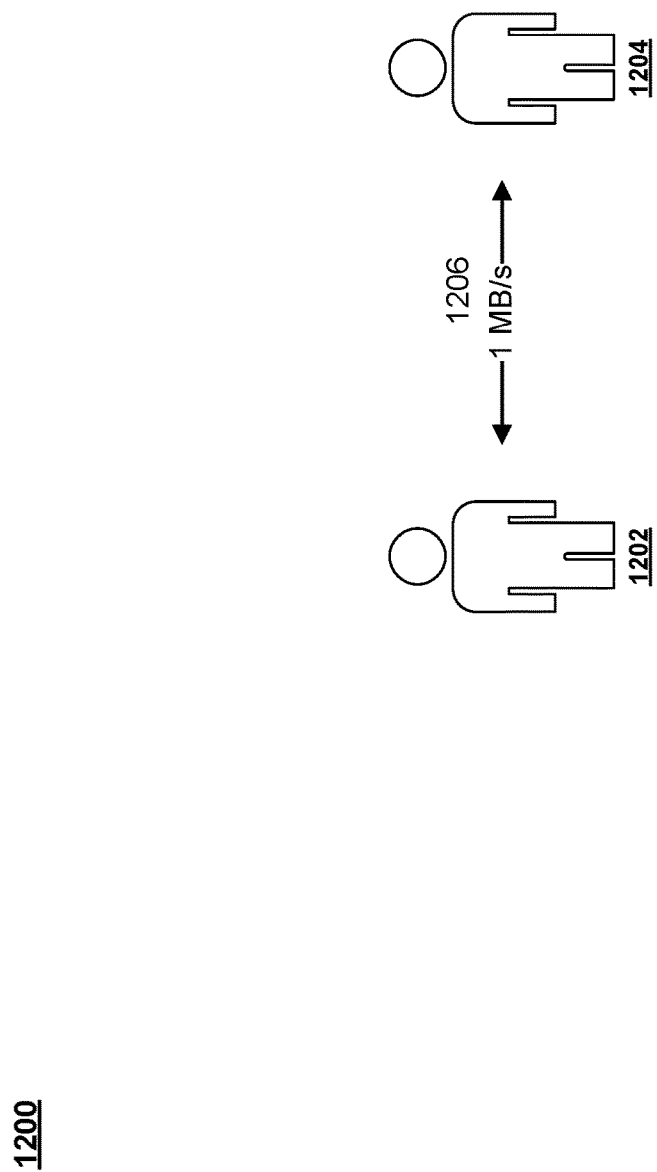

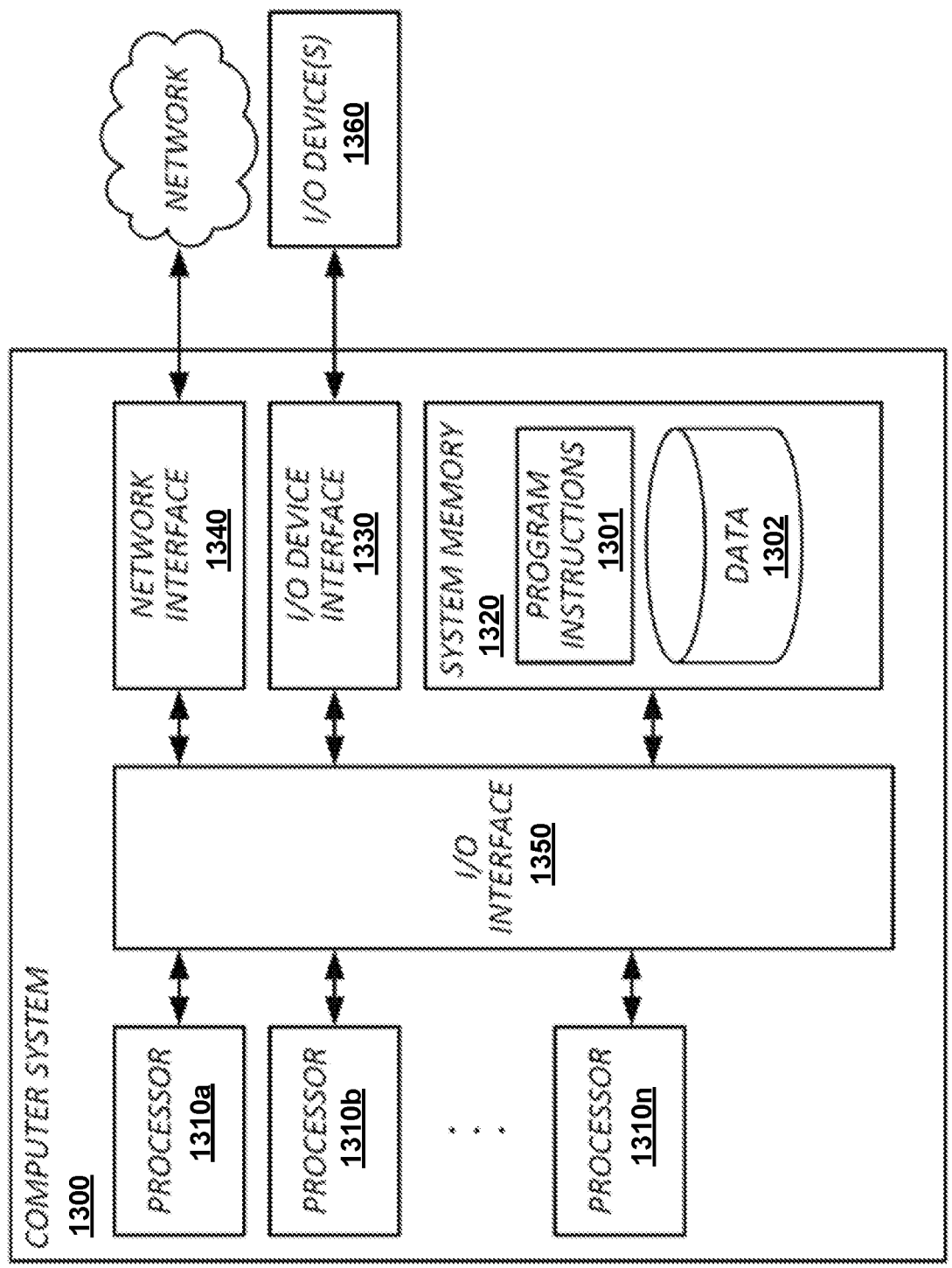

MIXED PEER-TO-PEER MESH AND FORWARDING SYSTEM

CROSS-REFERENCE TO RELATED APPLICATIONS

This patent application is a continuation of U.S. patent application Ser. No. 18/077,984, titled "Mixed Peer-To-Peer Mesh And Forwarding System," filed 8 Dec. 2022, which claims the benefit of U.S. Provisional Patent Application 63/288,435, titled "Mesh Network Signal Caching System," filed 10 Dec. 2021, U.S. Provisional Patent Application 63/391,652, titled "Mixed Peer-To-Peer Mesh and Streaming System," filed 22 Jul. 2022, and U.S. Provisional Patent Application 63/398,485, titled "Authoritative State Distribution," filed 16 Aug. 2022. The entire content of each aforementioned patent filing is hereby incorporated by reference.

BACKGROUND

1. Field

The present disclosure relates generally to peer-to-peer mesh networks and, more specifically, to a system that provides mixed peer-to-peer streaming and streaming through a streaming forwarding sever for participants in the mesh network.

2. Description of the Related Art

Many software applications may stream media such as video, audio, or other data between participants of the application. Video and audio streaming may enhance a user experience of the application by allowing more personal interactions between the participants of an application instance. For example, in some gaming applications, video and audio may be streamed between participants of a gaming instance. However, as the number streams between a particular participant and other participants grows, the quality of the audio and video streams are reduced and may cause the streaming sessions to fail.

As such, systems have been developed to limit the number of streams per participant to maintain an acceptable stream quality. One such system includes peer-to-peer mesh topologies where subsets of participants are connected to each other for streaming video and/or audio. However, peer-to-peer mesh topologies present problems discussed below.

SUMMARY

The following is a non-exhaustive listing of some aspects of the present techniques. These and other aspects are described in the following disclosure.

Some aspects include a process including: establishing, with a first client computing device, a first peer-to-peer connection with a second client computing device; determining, with the first client computing device, that a first media stream provided by the first client computing device satisfies at least one selective forwarding unit streaming condition; and providing, with the first client computing device and in response to the first media stream satisfying the at least one selective forwarding unit streaming condition, the first media stream to the second client computing device via a selective forwarding unit.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIGS. 12A, 12B and 12C illustrate a block diagram of an example flow of the process of FIG. 11, in accordance with some embodiments of the present disclosure;

FIG. 13 illustrates an example computing device by which the present techniques may be implemented, in accordance with some embodiments of the present disclosure.

Figure 1:
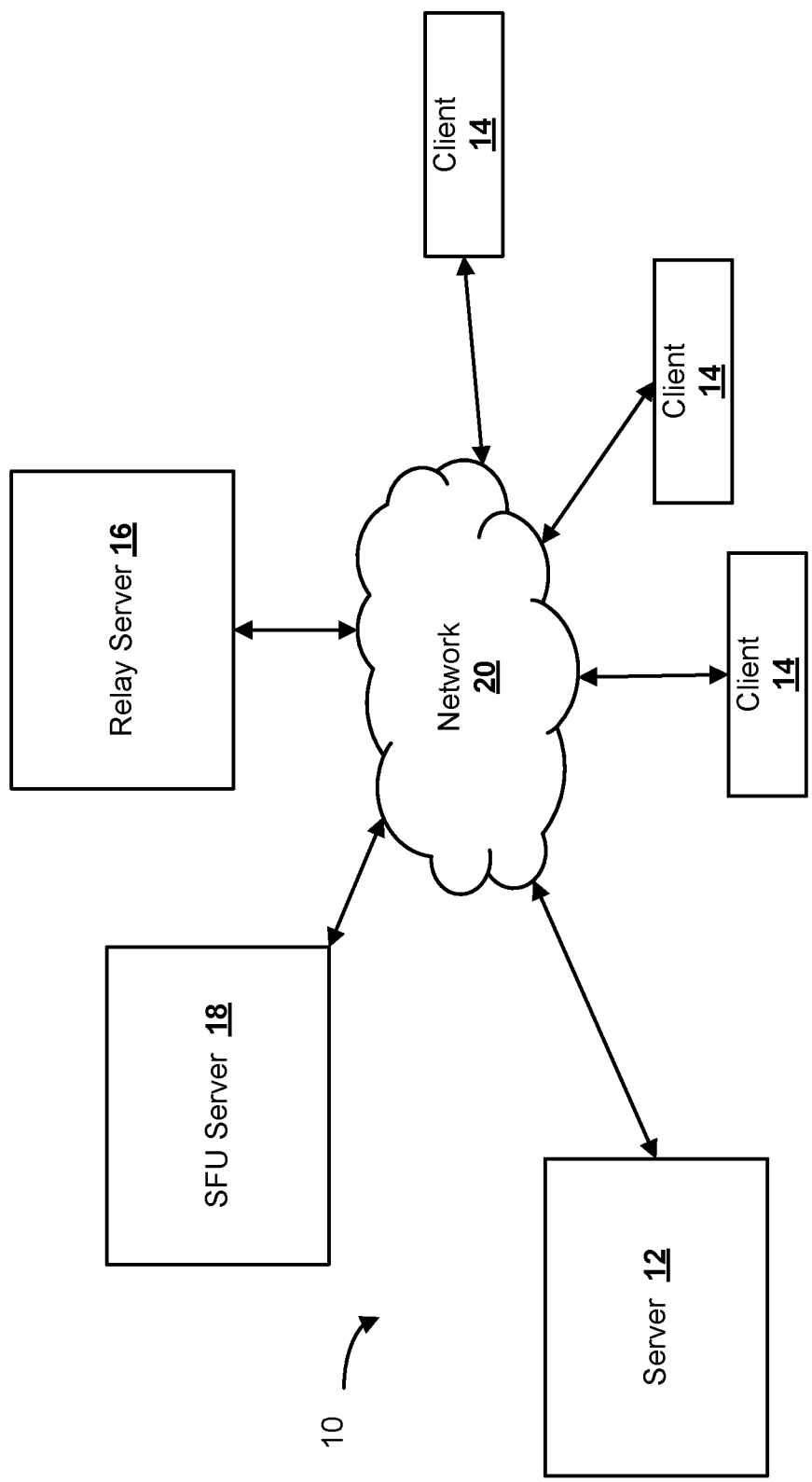
FIG. 1 illustrates a computing environment in which the present techniques may be implemented according to some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of media streaming, virtual coordinate grid environments, and peer-to-peer mesh networks. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As discussed above, it is increasingly common that applications stream media (e.g., video, audio, and/or other data) between participants in an application environment, such as a gaming environment, a communication environment, a social media environment, a virtual reality environment, applications that incorporate a coordinate grid, or any other application environment that would be apparent to one of skill in the art in possession of the present disclosure. As populations of an application instance grow, the harder it becomes to reliably sustain connections between subsets of participants. There is often little need to maintain streams between all participants, but proximate connections are very valuable in various circumstances.

Some common streaming architectures include a peer-to-peer (P2P) (also referred to as mesh or P2P mesh) architecture, a selective forwarding unit (SFU) architecture, a multipoint conferencing unit (MCU) architecture, and an experience delivery network (XDN) architecture.

A P2P mesh topology may be the easiest to establish and often the most cost-effective architecture that may be used in a real-time communication application such as an application that includes WebRTC (Web Real-Time Communication). However, it is also the least scalable. In a P2P mesh topology, two or more peers (clients) talk to each other directly or, when on opposite sides of a firewall, via a relay server which relays audio, video, and other data streaming to them.

P2P applications can be resource intensive, because the burden of encoding and decoding media streams is offloaded to each peer, which is why P2P performs best when there are only a small number of concurrent users (e.g. 10 or fewer). Although some level of scalability can be achieved on a P2P application by configuring a P2P mesh network, P2P applications are resource-intensive and inefficient. However, a P2P application provides the best end-to-end encryption because it does not depend on a centralized server to encode/decode streams.

A peer-to-peer mesh topology can adequately connect subsets of the application instance population, but there remains the challenge of accurately negotiating a connection between two individual peers, quickly.

For these reasons real-time communication application developers often rely on other architectures such as the SFU architecture that includes a pass-through routing system designed to offload some of the stream processing from each client to a server. Each participant sends their encrypted media streams once to a centralized server, which then forwards those streams, without further processing, to the other participants in the application. Other real-time communication applications use the MCU architecture where each client is connected to a centralized MCU server, which decodes, rescales, and mixes all incoming streams into a single new stream and then encodes and sends the signal stream to all clients. Still other real-time communication applications use the XDN architecture that uses a cloud-based clustering architecture rather than a centralized server to tackle WebRTC's scalability issues.

Most video games or other coordinate grid-based applications that include real-time communication utilize a central state server to resolve the accuracy in resolution or truthiness of events that each participant can agree upon and report these updates to the clients. These updates can be for participant movement and other events (e.g., movement of objects in the environment, attributes of the participant (e.g., health, strength, speed, or other attributes of the participant)). The server typically confirms behavior before reporting to clients so that clients can trust the updates given. This is important to do to create agreement between participants that an outcome occurred. However, confirming behavior before reporting to the clients requires extra processing on the server to resolve outcomes of interactions between participants. As such, an MCU architecture provides both the real-time communication and the truthiness requirement. There are limits on the scalability of a system like this such that as virtual world populations grow, the trade-off between accuracy in participant position versus efficiency of the central state server becomes important. As participant counts increase, agreed-to truth becomes a limiting factor in the scale of a world. More and more processing power and network bandwidth is necessary to distribute these changes and updates to all other participants. So many confirmed updates controlled by a single server or process limits the number of participants in a world such as a particular coordinate grid instance. However, certain states or coordinate grid-based applications do not require outcomes between participants that need to be agreed upon in real-time. Thus, there is no need for a centrally controlled state-server. In such situations, it would be ideal to use a P2P mesh topology to remove the extra hardware of the SFU. Distribution of this work to clients is crucial to build a service that can host hundreds, thousands, or tens of thousands of participants simultaneously.

Peer-to-Peer Signal Caching and Server Authoritative State Management

Embodiments of the present disclosure provide an application platform where each participant can determine its own state or coordinate grid state of where that participant is in relation to other participants in a coordinate grid-based environment provided by the application at the current time. The only truth that matters is where each participant is in relation to other participants. There is no consequence on the application platform if two participants believe there are slight differences between each other's relative positioning (e.g., actual physical location or location within the virtual application environment). It will eventually resolve when participants stop moving.

In distributing state management to participants, the application platform achieves highly scalable servers. The only work the server may do is to receive a user input event such as a click event or other user input from a participant.

The user input captures the participant's current position in the virtual environment (e.g., a coordinate in a coordinate grid (e.g., a three-dimensional grid or a two-dimensional grid)), the user input position (e.g., a coordinate in the coordinate grid where the user as instructed the participant (e.g., an avatar) to move within the virtual environment), and the time of the user input. The central server may obtain the three data points and overwrites any existing position description or state of the participant who moved. This is the participant's current state (e.g., position description) and will remain so until a new movement instruction is received and distributed. This payload is distributed to all participants of the application platform and completes the server's job. The network load to achieve this is less than if the server determines all the states of the participant by itself. Each client computing device that is associated with a participant in the coordinate grid of the application environment is then responsible for updating the position of (n) other participants at whatever framerate each client can execute at.

The distribution of state calculations alleviates the processing that a central server must do to update all poisons of all participants in a world O(N) updates per frame and then a transmission of all deltas to all participants every frame. This significantly reduces processing consumption and network bandwidth on the whole system and allows for thousands of participants to take part in a single world.

However, distributing the state introduces additional issues with respect to a peer-to-peer architecture. Connecting two or more participants in a single lobby or peer-to-peer connection requires relaying "offer" signals from an "initiator" to a "recipient" who will respond with "response" signals. If these participants properly exchange P2P connection initiation signals, a peer-to-peer connection, such as a WebRTC connection, between the two can open.

Nevertheless, there are challenges in transmitting these exchanged P2P connection initiation signals back and forth between two participants. For example, the first challenge is the need for a relaying server. This is normally done utilizing persistently connected WebSocket from each participant to a server node. Each initiator participant may send the relay server their P2P connection initiation signal and the relay server relays the signals over to the respective recipient participant. The second challenge is the availability of the "recipient" participant to reciprocate "response" signals after receiving the "offer" signals from the "initiator." In some scenarios the "recipient" may be unavailable by being unable or unwilling to connect. There are several potential reasons for a "recipient" to be in this state of unavailability. One reason may be that the "recipient" has maxed out available connection slots and is not processing any inbound "offers."

Another reason may be that the "recipient" is not yet aware of the "initiator's" intent to connect (e.g., the state between participants is not yet agreed to). As discussed above, the distributed state management introduces a new problem in peer-to-peer networks where participants can determine that they are to connect to each other asynchronously. In an application that has no centrally controlled state-server, because each participant controls their own state, each participant can arrive at the conclusion that they are close enough to connect to another participant via webRTC or other peer-to-peer connection protocol at different times. For example, Participant A, an "initiator," could determine that they are within connection radius of Participant B, a "recipient," and Participant B may not acknowledge this truth for some time later. As a result, there is a chance that peer-to-peer connection initiation signals, such as webRTC "offers," to "recipients" and the peer-to-peer connection response signals, such as WebRTC "responses," to "initiators" are missed, which makes the P2P architecture less reliable.

As such, further embodiments of the present disclosure solve these issues by including a local signal cache for each participant such that a client computing device associated with the participant stores any peer-to-peer connection initiation signals. The "recipient" should do one of two things with an inbound "offer" signal. If the "recipient" is ready to process the "offer" because it is aware of the "initiator's" valid inbound connection attempt, then it should process the "offer" and respond with a "response" (e.g., both participants agree on state). If this "recipient" is not able to process the inbound "offers" at the time of receipt from the "initiator," then the "recipient" should store those inbound "offers" in the local signal cache. This local signal cache, assigned to the "initiator" who sent the "offer" holds the "offer" for processing at a later time.

If, the "recipient" becomes aware of a valid condition to connect to the "initiator" and the local signal cache is populated with that "initiator's" valid offer, then the "recipient" can process the "offer" and send a "response" immediately, without having to trigger the generation of a new "offer." At this time, the "initiator" can still be waiting for the "recipient's" "response" for processing. If the "initiator" has moved on and determined that the "recipient" is no longer in "proximity" to the "initiator", then there is nothing left to do as the "initiator" would no longer accept a "response."

FIG. 1 illustrates an example of a computing environment 10 in which the present techniques may be implemented. In some embodiments, the computing environment 10 is a distributed computing environment implementing a client/server architecture, though other architectures are contemplated, including monolithic architectures executing on a single computing device. In some embodiments, the computing environment 10 includes a server 12, client computing devices 14, a relay server 16, a selective forwarding unit 18, and a network 20, such as the Internet, by which these components may communicate.

In some embodiments, the client computing devices 14 are desktop computers, laptop computers, in-store kiosks, tablet computers, mobile phones, head-mounted displays, game consoles, set-top boxes or any other computing device that would be apparent to one of skill in the art in possession of the present disclosure, executing an operating system and a web browser or native application in which the described user interfaces are presented. Three client computing devices 14 are shown, but embodiments may support substantially more concurrent sessions, e.g., more than 100, or more than 1,000 geographically distributed sessions around the US or the world.

In some embodiments, the server 12 is a nonblocking web server or application program interface server configured to service multiple concurrent sessions with different client computing devices 14, for instance implementing a model-view-controller architecture or other design. In some embodiments, the server 12 may dynamically generate assets, markup language instructions, and scripting language instructions responsive to requests from client computing devices 14 to send user interfaces to, or update user interfaces on, those client computing devices 14. The user interface may evolve over time (e.g., in a web application), in some cases, displaying new resources (e.g., images and other data) sent from the server 12 responsive to user inputs to the user interface.

A configuration engine and rendering engine included on the server may be used to generate image files and metadata used by the server 12 to generate the user interfaces, for example providing a virtual two-dimensional or a virtual three-dimensional coordinate grid environment, an augmented reality environment, a virtual reality environment, a metaverse environment, or any other coordinate grid environment or application environment that would be apparent to one of skill in the art in possession of the present disclosure and benefit from the teachings of the present disclosure.

In some embodiments, the relay server 16 is a server configured to create websockets or other persistent connections with each client 14. Each client 14 can then send their initiation and response signals for establishing a real-time communication session (e.g., a WebRTC connection) via the relay server 16. The selective forwarding unit 18 may be server that is configured to receive media form participants and decides which streams of media should be forwarded to other participants and then performs the forwarding. While the server 12, the relay server 16, and the selective forwarding unit 18 are illustrated as separate servers, various embodiments of the present disclosure may include a single server that provides the application, the relay, or the media forwarding functionality of the server 12, the relay server 16, or the selective forwarding unit 18.

Figure 2:
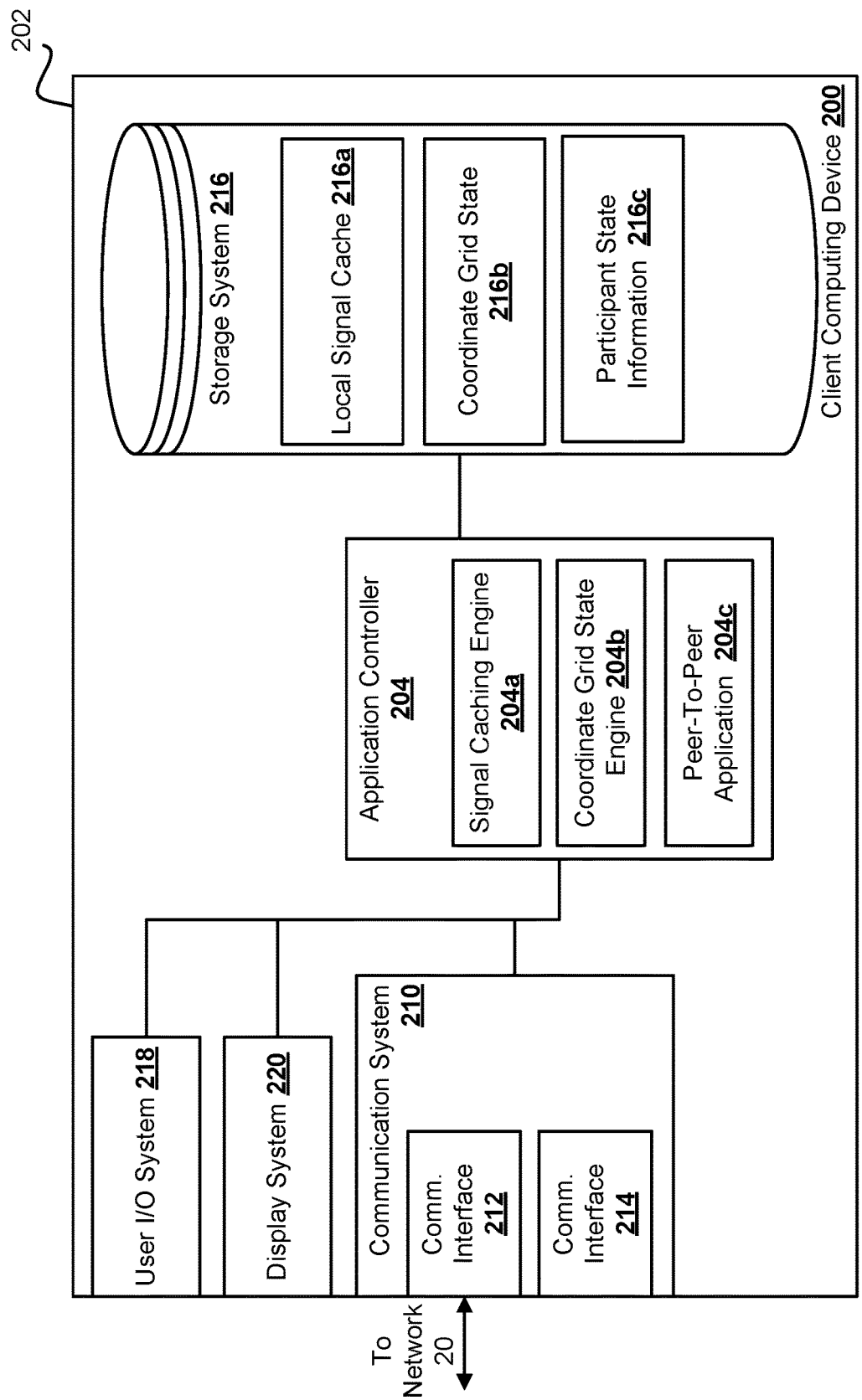
FIG. 2 is a block diagram illustrating an example of a client computing device of the computing environment of FIG. 1, in accordance with some embodiments of the present disclosure.

FIG. 2 illustrates an embodiment of a client computing device 200 that may be any of the client computing devices 14 discussed above with reference to FIG. 1. In the illustrated embodiment, the client computing device 200 includes a chassis 202 that houses the components of the client computing device 200. Several of these components are illustrated in FIG. 2. For example, the chassis 202 may house a processing system (not illustrated) and a non-transitory memory system (not illustrated) that includes instructions that, when executed by the processing system, cause the processing system to provide a peer-to-peer (P2P) application controller 204 that is configured to perform the functions of the peer-to-peer application controller or client computing devices discussed below. In the specific example illustrated in FIG. 2, the peer-to-peer application controller 204 is configured to provide a native application or a browser application (e.g., a peer-to-peer application) such as an Internet web browser to communicate with an application instance operating on the server 12 or the relay server 16. The peer-to-peer application controller 204 may be configured to call a peer-to-peer application programming interface (API) (e.g., a WebRTC API) or other peer-to-peer programs for facilitating peer-to-peer communications. The peer-to-peer application controller 204 may also include a signal caching engine 204a that is configured to cache peer-to-peer signals (e.g., initiator "offers"), determine whether peer-to-peer connection conditions exists based on coordinate grid states or other information, or other functionality that will be discussed in further detail below. The peer-to-peer application controller 204 may also include a coordinate grid state engine 204b that is configured to capture a participant or object position change input in the environment or other participant state changes, send a position change to a state server (e.g., the server 12), receive a participant state payload of all the participants in the coordinate grid environment, and determine a coordinate grid state of all the participants in the environment from the participant state payload.

The chassis 202 may further house a communication system 210 that is coupled to the peer-to-peer application controller 204 (e.g., via a coupling between the communication system 210 and the processing system). The communication system 210 may include software or instructions that are stored on a computer-readable medium and that allow the client computing device 200 to send and receive information through the communication networks discussed above. For example, the communication system 210 may include a communication interface 212 to provide for communications through the network 20 as detailed above (e.g., first (e.g., long-range) transceiver(s)). In an embodiment, the communication interface 212 may include a wireless antenna that is configured to provide communications with IEEE 802.11 protocols (Wi-Fi), cellular communications, satellite communications, other microwave radio communications and/or communications. The communication system 210 may also include a communication interface 214 (e.g., the second (e.g., short-range) transceiver(s)) that is configured to provide direct communication with other client computing devices 14 of FIG. 1, sensors, storage devices, or other devices discussed above with respect to FIG. 1. For example, the communication interface 214 may include a wireless antenna that configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and/or other wireless communication protocols that allow for direct communication between devices.

The chassis 202 may house a storage device (not illustrated) that provides a storage system 216 that is coupled to the peer-to-peer application controller 204 through the processing system. The storage system 216 may be configured to store a local signal cache 216a (e.g., a cache of the peer-to-peer initiation signals) a coordinate grid state 216b that stores one or more coordinate grid states that indicate the current location of participants in the coordinate grid environment provided by the application. The coordinate grid state may include calculated coordinate grid states determined from the participant state information of the participants gathered by the server 12. The participant state information may include raw participant state information gathered by the client computing device 14/200 or gathered by the server 12. While specific instructions and data are described as being stored in the storage system 216, a person of skill in the art in possession of the present disclosure will recognize that other instructions may be used to perform the functions described herein as described below.

In various embodiments, the chassis 202 also houses a user Input/Output (I/O) system 218 that is coupled to the peer-to-peer application controller 204 (e.g., via a coupling between the processing system and the user I/O system 218). In an embodiment, the user I/O system 218 may be provided by a keyboard input subsystem, a mouse input subsystem, a track pad input subsystem, a touch input display subsystem, a microphone, an audio system, a haptic feedback system, and/or any other input subsystem. The chassis 202 also houses a display system 220 that is coupled to the peer-to-peer application controller 204 (e.g., via a coupling between the processing system and the display system 220) and may be included in the user I/O system 218. In an embodiment, the display system 220 may be provided by a display device that is integrated into the client computing device 200 and that includes a display screen (e.g., a display screen on a laptop/notebook computing device, a tablet computing device, a mobile phone, or wearable device), or by a display device that is coupled directly to the client computing device 200 (e.g., a display device coupled to a desktop computing device by a cabled or wireless connection). While a particular client computing device 200 is illustrated in FIG. 2, one of skill in the art in possession of the present disclosure will recognize that the client computing device 200 may include additional or fewer components and still fall under the scope of the present disclosure.

Figure 3:
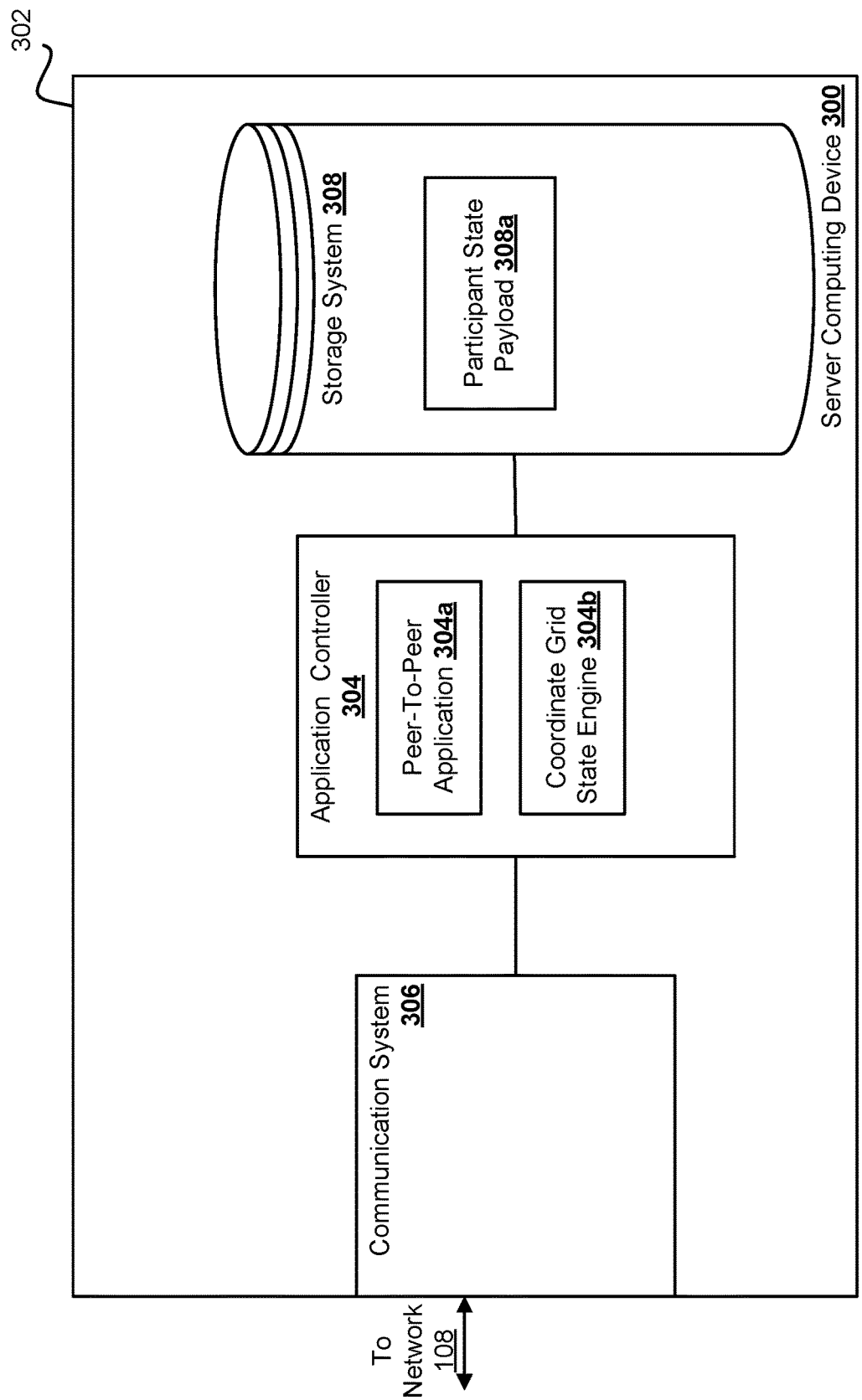
FIG. 3 is a block diagram illustrating an example of a server computing device of the computing environment of FIG. 1, in accordance with some embodiments of the present disclosure.

FIG. 3 illustrates an embodiment of a server computing device 300 that may be the server 12 discussed above with reference to FIG. 1. However, in other embodiments, the server computing device 300 may be the selective forwarding unit 18 or the relay server 16. In the illustrated embodiment, the server computing device 300 includes a chassis 302 that houses the components of the server computing device 300, only some of which are illustrated in FIG. 3. For example, the chassis 302 may house a processing system (not illustrated) and a non-transitory memory system (not illustrated) that includes instructions that, when executed by the processing system, cause the processing system to provide a peer-to-peer application controller 304 that is configured to perform the functions of the peer-to-peer application controllers and/or server devices discussed below. The peer-to-peer application controller 304 may be configured to provide a peer-to-peer application 304a that provides one or more coordinate grid environments to the clients 14/200 such that the clients 14/200 may participate in the peer-to-peer application 304a hosted by the peer-to-peer application controller 304. In various embodiments, the peer-to-peer application controller 304 may include a coordinate grid state engine 304b that receives participant state information of each of the participants in each coordinate grid environment instance hosted by the peer-to-peer application controller 304, compiles those participant states into a participant state payload 308a, and provides the participant state payload to the various participants (e.g., the clients 14/200), as discussed in further detail below.

The chassis 302 may further house a communication system 306 that is coupled to the peer-to-peer application controller 304 (e.g., via a coupling between the communication system 306 and the processing system) and that is configured to provide for communication through the network 20 of FIG. 1 as detailed below. The communication system 306 may allow the server computing device 300 to send and receive information over the network 20 of FIG. 1. The chassis 302 may also house a storage device (not illustrated) that provides a storage system 308 that is coupled to the peer-to-peer application controller 304 through the processing system. The storage system 308 may be configured to store a participant state payload 308a or other data or instructions that would be apparent to one of skill in the art in possession of the present disclosure. In various embodiments, the storage system 308 may be provided on the server computing device 300 or on a database accessible via the communication system 306. In addition, in some embodiments, the server computing device 300 may host a relay engine (not illustrated) to perform the functions of the relay server 16. In yet other embodiments, the server computing device 300 may be a distributed server computing device where the functionality is performed by more than one server. While a particular server computing device 300 is illustrated in FIG. 3, one of skill in the art in possession of the present disclosure will recognize that the server computing device 300 may include additional or fewer components and still fall under the scope of the present disclosure.

1. Server Authoritative Coordinate Grid State System

Figure 4:
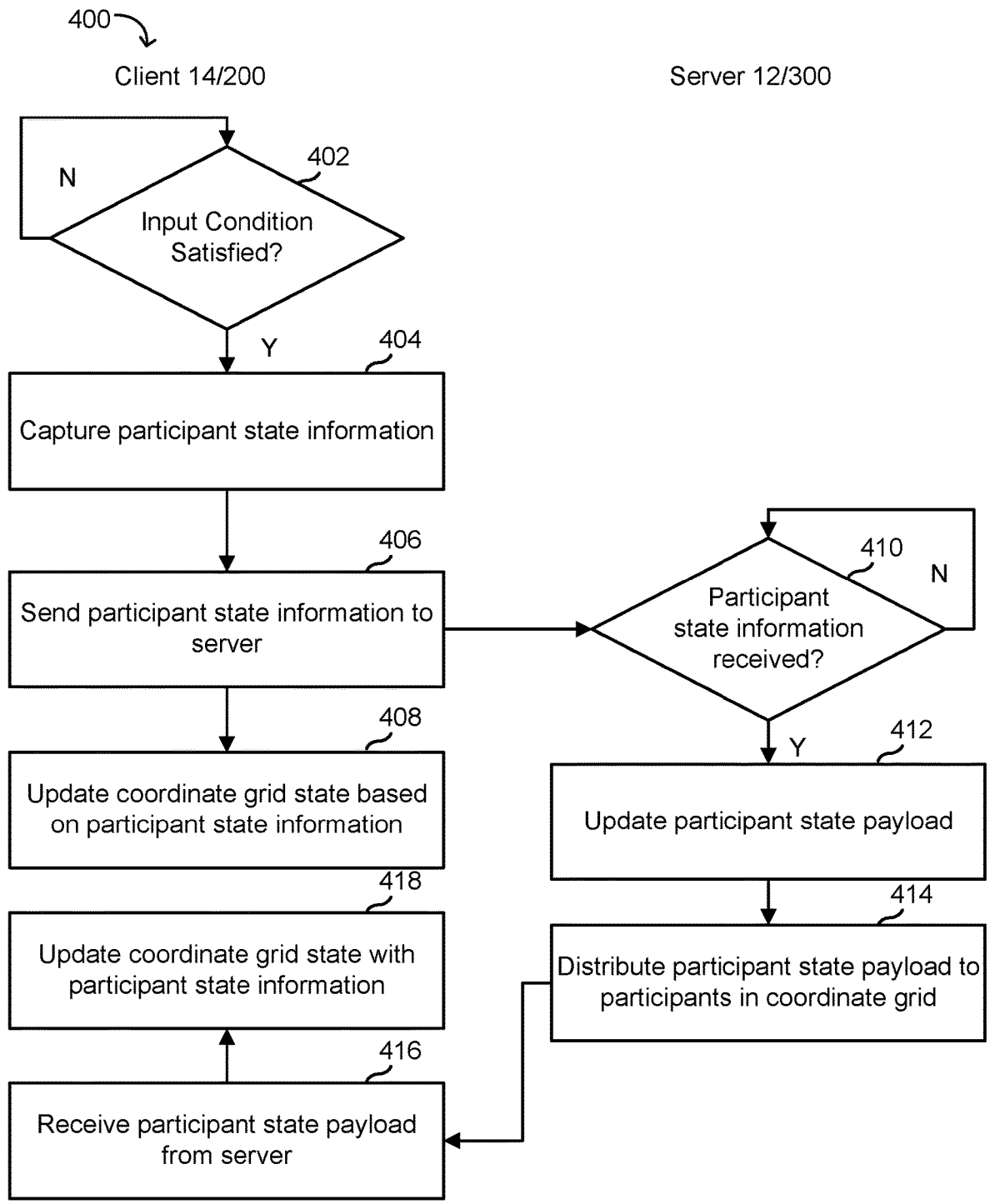
FIG. 4 illustrates a flowchart of a process of participant state distribution performed by the computing environment of FIG. 1, in accordance with some embodiments of the present disclosure.

In some embodiments, the server 12, the relay server 16, or the clients 14 may execute a process 400 of FIG. 4, for example, by executing program code stored on a tangible, non-transitory, machine-readable medium. The illustrated operations may be executed in a different order, omitted, replicated, executed concurrently, executed serially, have additional operations inserted, all be automated, involve human intervention, or otherwise be modified relative to the arrangement depicted, which is not to suggest that any other description herein is limiting.

In some embodiments, the process 400 is illustrated in FIG. 4. The process 400 may begin at decision block 402 where it is determined whether a user input condition is satisfied. In an embodiment, at decision block 402, the client computing device 14/200 and in particular the coordinate grid state engine 204b may monitor the client computing device 14/200 for any user inputs that instruct a participant (e.g., an avatar, an object) that is provided by an application (e.g., the peer-to-peer application 304a hosted by the server computing device 12/300 or the peer-to-peer application 204c provided on the client computing device 14/200) that provides a coordinate grid environment to change state (e.g., move to a different position in the coordinate grid, change appearance or shape, or any other state changes that would be apparent one of skill in the art in possession of the present disclosure). The user input may be a point click on a graphical user interface with a mouse on a location in the application's coordinate grid environment, a touch input on a touchscreen of the client computing device 14/200, an input of coordinate instructions, a voice command, a gesture, or any other user input that may cause a participant in the peer-to-peer application 304a to change its state such as its position in the coordinate grid environment provided by the peer-to-peer application 304a. If no user input is detected that affects a state change of the participant, then the process 400 continues to monitor for a user input at decision block 402.

If a user input is detected, then the process 400 proceeds to block 404 where participant state information is captured. In an embodiment, at block 404, the coordinate grid state engine 204b may capture participant state information associated with the participant in the coordinate grid environment of the peer-to-peer application 204c/304a. For example, the coordinate grid state engine 204b may capture participant position information associated with the participant. The participant position information may include a current position (e.g., a two-dimensional coordinate, a three-dimensional coordinate, or any other information to describe a current position of the participant) in the coordinate grid environment of that participant, a user input position of that participant (e.g., a coordinate in the coordinate grid environment that the user input from decision block 402 that instructs the participant to move to), and a time of the user input for that participant. While a specific participant state information is discussed, other state information may be used that would be apparent to one of skill in the art in possession of the present disclosure.

The process 400 may then proceed to block 406 where the client computing device provides the participant state information to a server computing device. In an embodiment, at block 406, the peer-to-peer application controller 204 may provide the participant state information to the server computing device 12/300. For example, the peer-to-peer application controller 204 may send the participant state information via the network 20 to the server 12 using the communication systems 210 and 306. The participant state information may include a client computing device identifier, an identifier of an application instance that the participant is provided on (e.g., in some embodiment, the client computing device 200 may have, for example, multiple application instances of the peer-to-peer application 204c open such that each application instance could have a different participant in the coordinate grid environment provided by the peer-to-peer application 204c) or any other identifier that will associate a participant in the coordinate grid environment with participant state information of that participant. The participant state information may also include participant position information such as the current position of the participant in the coordinate grid, the position in the coordinate grid identified by the user input, and the time the user input was received. However, the participant state information provided to the sever 12/300 may include other participant state information.

The process may proceed to block 408 where a coordinate grid state is updated based on the participant state information. In an embodiment, at block 408, the coordinate grid state engine 204b may update the coordinate grid state 216b based on the participant state information that may include the participant position information for the participant associated with the application instance operating on the peer-to-peer application 204c. For example, the coordinate grid state 216b may include the distances between the participant and other participants in the coordinate grid environment based on those other participants' participant state information. For example, participant position information may include a current position of the participant in the coordinate grid environment, a user input position of the participant, and a time of the user input for that participant. The client computing device 14/200 may include the participant state information 216c for all the participants in the coordinate grid environment. As discussed in more detail below with respect to block 416, the client computing device 14/200 may have previously received a participant state payload from the server computing device 12/300 that may include participant state information for at least a portion of the participants in a coordinate grid environment. The participant state information for the participant of the client computing device 14/200 and the participant state information 216c for the participants in the coordinate grid environment may be used to determine a distance (e.g., using the distance formula) between the participant and the other participants in the coordinate grid environment, which is stored as the coordinate grid state 216b. The coordinate grid state 216b may be used for other determinations by the client computing device 14/200, as discussed in process 500 of FIG. 5.

The process 400 may include decision block 410 where the server computing device is determining whether participant state information is received from a client computing device. In an embodiment, at decision block 410, the coordinate grid state engine 304b may determine whether any updated participant state information has been received. The server computing device 12/300 may be in communication with the client computing devices 14/200, which may provide participant state information for their respective participant(s). If not, the coordinate grid state engine 304b may continue to monitor for participant state information at decision block 410.

If the server computing device has received the participant state information, such as the participant state information from block 406, the process 400 may proceed to block 412 where the server computing device updates the participant state payload. In an embodiment, at block 412, the coordinate grid state engine 304b may update a participant state payload 308a with any received participant state information. As discussed above, the participant state information may include participant position information such as a current position of the participant in the coordinate grid environment, a user input position of the participant, and a time of the user input for that participant as well as an identifier for the participant or client computing device 14/200. The server computing device 12/300 may compile all the participant state information for the participants in the coordinate grid environment being provided by the peer-to-peer application 304a running on the peer-to-peer application controller 304 into the participant state payload 308a. As such, the server computing device 12/300 gathers the participant states for each participant, which may include three data points of a current position of the participant in the coordinate grid environment, a user input position of the participant, and a time of the user input for that participant. The server computing device 12/300 simply updates any old participant state information with the new participant state information in the participant state payload 308a. The server computing device 12/300 may not calculate the coordinate grid state for the participants. As discussed above, this allows the coordinate grid environment to scale in participants by reducing the processing power and network bandwidth that is necessary to distribute state changes and updates to all other participants. So many confirmed updates controlled by a single server or process limits the number of participants in a world such as a particular coordinate grid environment instance.

The process 400 then proceeds to block 414 where the participant state payload is distributed to at least a portion of the participants in the coordinate grid environment. In an embodiment, at block 414, the server computing device 12/300 may distribute the participant state payload 308a to at least a portion of the client computing devices 14/200 in the coordinate grid environment. The distribution of the participant state payload 308a may occur in response to an update to the participant state payload 308a. As discussed, above the participant state payload may include the participant state information for at least a portion of the participants in the coordinate grid environment. For example, the participant state information may include participant position information that includes a current position of the participant in the coordinate grid environment, a user input position of the participant, and a time of the user input for that participant. However, as discussed herein, participant state information may include many parameters that would be apparent to one of skill in the art in possession of the present disclosure.

The process 400 then proceeds to block 416 where the client computing device receives the participant state payload from the server computing device. In embodiment, at block 416, the client computing device 14/200 may receive the participant state payload 308a from the server computing device 12/300. The participant state payload 308a may be received by at least a portion of the client computing devices 14/200 in the computing environment 10 to calculate their own coordinate grid states 216b.

The process 400 then proceeds to block 418 where the client computing device updates its coordinate grid state based on the participant state information included in the participant state payload. In an embodiment, at block 418, the coordinate grid state engine 204b may determine that there has been a change in participant state information when comparing the participant state information received in the participant state payload and a previous version of the participant state information received in a prior participant state payload. The coordinate grid state engine 204b may update the participant state information 216c and then recalculate the coordinate grid state 216b. As such, the processing of the coordinate grid state 216b is distributed such that each client computing device 14/200 performs the calculations rather than the server computing device 12/300. This reduces the use of processing resources and other resources of the server computing device 12/300 and communication demand on the network 20, which allows the coordinate grid environment to scale while still maintaining a satisfactory agreed-to truth in the coordinate grid state between the participants.

As discussed above, by offloading the coordinate grid state calculations to the individual client computing devices causes issues in peer-to-peer communication establishments when those peer-to-peer communication initiations are dependent on proximity between participants. This is because the coordinate grid states may be calculated by the client computing devices at different times. As such, a client computing device that has calculated a coordinate grid state and that has determined that another participant is in range of its participant may initiate a peer-to-peer connection without that other participant determining that it can initiate the peer-to-peer connection, which may cause the other participant to ignore a peer-to-peer connection initiation signal sent from the client computing device. As such, the systems and methods of the present disclosure provide a signal cache that allows a client computing device to store peer-to-peer connection initiation signals until the coordinate grid state is updated by that client computing device and it can determine that it satisfies a condition to negotiate a peer-to-peer connection.

2. Peer-to-Peer Mesh Network Signal Caching

Figure 5:
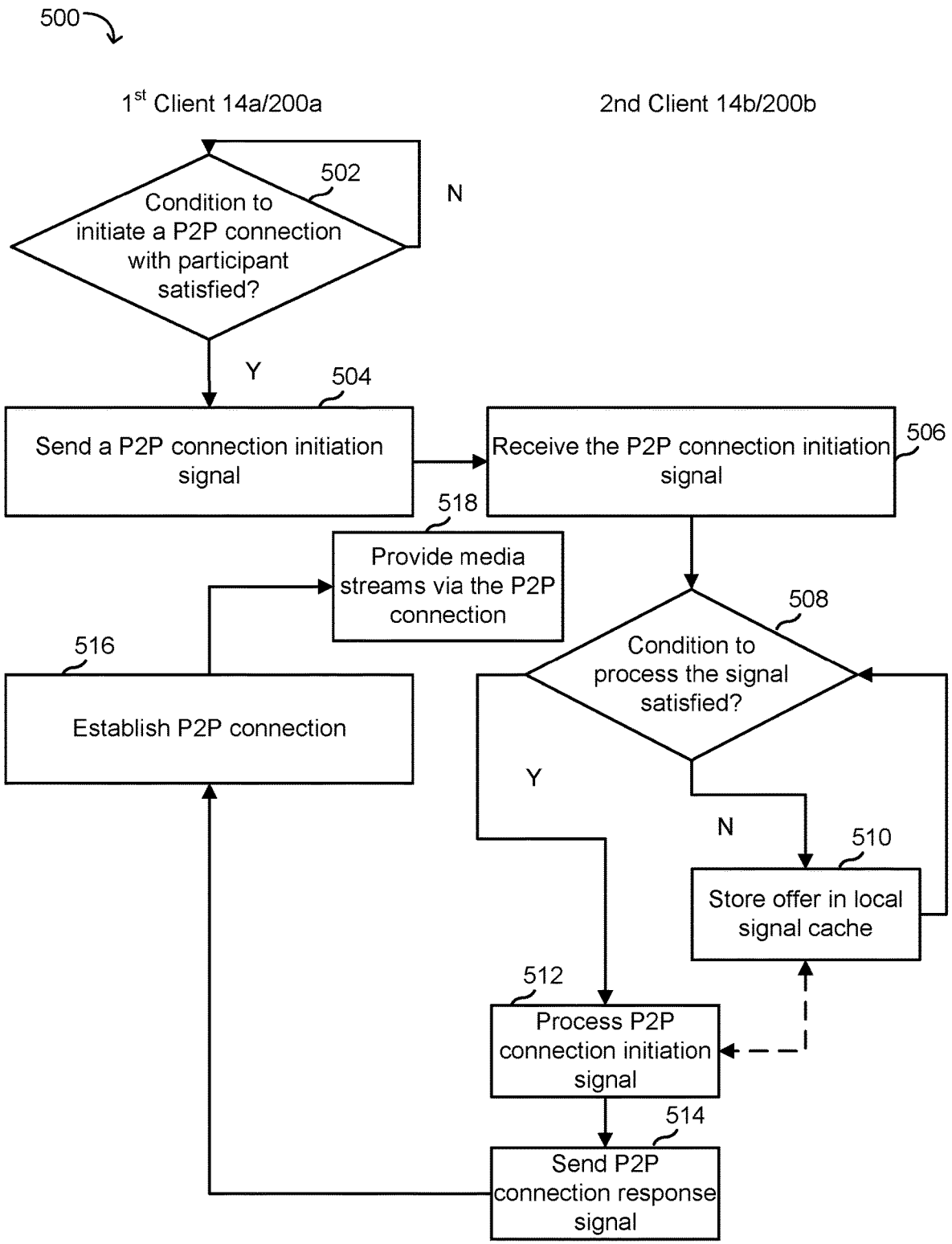
FIG. 5 illustrates a flowchart of a process of peer-to-peer signal caching performed by the computing environment of FIG. 1, in accordance with some embodiments of the present disclosure.

In some embodiments, the server 12, the relay server 16, or the clients 14 may execute a process 500 of FIG. 5, for example, by executing program code stored on a tangible, non-transitory, machine-readable medium. The illustrated operations may be executed in a different order, omitted, replicated, executed concurrently, executed serially, have additional operations inserted, all be automated, involve human intervention, or otherwise be modified relative to the arrangement depicted, which is not to suggest that any other description herein is limiting.

In some embodiments, the process 500 is illustrated in FIG. 5. The process 500 may begin at decision block 502 where it is determined whether a peer-to-peer connection condition to initiate a peer-to-peer connection between client computing devices associated with participants is satisfied. In an embodiment, at decision block 502, the peer-to-peer application 204c of the first client computing device 14a/200a may determine whether a condition is satisfied to establish a peer-to-peer connection with a second client computing device 14b/200b. For example, the peer-to-peer application 204c may determine whether a participant associated with the second client computing device 14b/200b is within proximity to a participant associated with the first client computing device 14a/200a. The peer-to-peer application 204c may determine the distances between the participant of the client computing device 14a/200a with other participants in a coordinate grid environment provided by the peer-to-peer application 204c. To do so, the peer-to-peer application 204c may reference the coordinate grid state 216b determined by the client computing device 14a/200a using the process 400 described above. While the peer-to-peer connection condition may be based on a proximity or a predetermined distance, other peer-to-peer connection conditions may be contemplated where asynchronies between participants occurs making one participant ready for a peer-to-peer connection while the other participant is not ready for the peer-to-peer connection. In another embodiment, the peer-to-peer connection condition to initiate a peer-to-peer connection may include a user input to connect the participant with another participant. While some conditions to initiate a peer-to-peer connection are discussed, one of skill in the art in possession of the present disclosure will recognize that other conditions may cause a client computing device to initiate a peer-to-peer connection with another participant.

The process 500 may proceed to block 504 where the first client computing device sends a peer-to-peer connection initiation signal to a second client computing device and the second client computing device receives the connection initiation signal at block 506. In various embodiments, the first client computing device 14a/200a may determine that it is to be an initiator of peer-to-peer connection with the second client computing device 14b/200b. For example, the first client computing device 14a/200a may determine it is the initiator based on its participant identifier and the participant identifier associated with the second client computing device 14b/200b. Specifically, the first client computing device 14a/200a may determine that its participant identifier is greater than the participant identifier associated with the second client computing device 14b/200b, which satisfies a participant identifier condition. However, in other embodiments, the participant identifier that is assigned the lowest participant identifier may be the initiator of the peer-to-peer connection or other information besides participant identifiers are used to determine an initiator status.

As such, the first client computer device 14a/200a generates and sends the peer-to-peer connection initiation signal to the second client computer device 14b/200b. For example, the peer-to-peer application 204c may communicate with a real-time communication (RTC) application programming interface (API) such as, for example, a WebRTC API. The WebRTC protocol may include the interactive connectivity establishment (ICE) protocol for establishing a peer-to-peer connection. As such, the peer-to-peer initiation signal may include a session description protocol (SDP) offer according to the SDP protocol. In various embodiments, the peer-to-peer initiation signal is provided via the network 20 and the relay server 16. For example, the peer-to-peer initiation signal is provided through a persistent connection (e.g., a websocket) established between the first client computing device 14a/200a and the relay server 16 and a persistent connection established between the second client computing device 14b/200b and the relay server 16. The second client computing device 14b/200b may then receive the peer-to-peer initiation signal.

The process 500 may then proceed to decision block 508 where it is determined by the second client computing device whether a condition to process the peer-to-peer initiation signal is satisfied. In an embodiment, at decision block 508, the second client computing device 14b/200b may determine whether a condition exists to process a peer-to-peer initiation signal. For example, the second client computing device 14b/200b may determine whether it is available to process the peer-to-peer initiation signal. In some embodiments, the second client computing device 14b/200b may be available when the second client computing device 14b/200b determines that a peer-to-peer connection condition is satisfied such as a proximity condition is satisfied with the first client computing device 14a/200a. As discussed above, the second client computing device 14b/200b may determine this condition being satisfied at a different time than the first client computing device 14a/200a due to network connectivity, a difference in processing speeds between the second client computing device 14b/

200*b* and the first client computing device 14*a*/200*a* when determining the coordinate grid state 216*b*, if the second client computing device 14*b*/200*b* has established a maximum number of the peer-to-peer connection, or any other reason that the first client computing device 14*a*/200*a* determines that the peer-to-peer connection with the second client computing device 14*b*/200*b* is supposed to be established before the second client computing device 14*b*/200*b* determines that the peer-to-peer connection is to be established. For example, the peer-to-peer connection may depend on whether the second client computing device 14*b*/200*b* has any available peer-to-peer connections. Specifically, each client computing device 14/200 may be assigned a maximum number of peer-to-peer connections (e.g., 10 peer-to-peer connections, 8 peer-to-peer connections, and/or any other number of peer-to-peer connections that would be apparent to one of skill in the art in possession of the present disclosure). The number of peer-to-peer connections may be based on a quality requirement of media streams (an audio stream, a video stream, audiovisual stream, or other data stream) that is to be provided via the peer-to-peer connection.

In conventional systems, if the second client computing device 14*b*/200*b* has determined that the peer-to-peer condition has not been satisfied, then the second client 14*b*/200*b* may ignore the peer-to-peer connection signal that it receives. As such, the first client computing device 14*a*/200*a* may be waiting for a response (e.g., an SDP answer to the SDP offer) with no response every reaching it.

If, at decision block 508, it is determined that the second client computing device is not available, then the process 500 may proceed to block 510 where the peer-to-peer connection initiation signal is stored in a local signal cache 216*a*. In an embodiment, at block 510, the relay server 16 or the second client computing device 14*b*/200*b* via the signal caching engine 204*a* may store the peer-to-peer connection initiation signal in the local signal cache 216*a*. For example, the local signal cache 216*a* may include a data structure that includes the identifier of the initiator (e.g., the first client computing device 14*a*/200*a* or participant associated with the first client computing device 14*a*/200*a*), the peer-to-peer connection initiation signal, and the time that the peer-to-peer connection initiation signal was received. As such, the local signal cache 216*a* may include an entry for each initiator with the second client computing device 14*b*/200*b*. If a peer-to-peer connection initiation signal is already associated with the initiator (e.g., the first client computing device 14*a*/200*a*) in the local signal cache 216*a*, the second client computing device 14*b*/200*b* may update the peer-to-peer connection initiation signal with the most current peer-to-peer connection initiation signal and remove any previously received peer-to-peer connection initiation signal. The second client computing device 14*b*/200*b* may continue to monitor whether the peer-to-peer connection condition exists by returning to decision block 508.

In various embodiments, the relay server 16 may provide the local signal cache 216*a* for each of the client computing device 14. For example, relay server 16 could cache the peer-to-peer connection initiation signals and pass those peer-to-peer connection initiation signals between the first client computing device 14*a*/200*a* and the second client computing device 14*b*/200*b* when they are requested. If no signal exists on the server-side signal cache, then the participants/clients can enter a waiting state where either side will process the signals in real-time, bypassing the server-side signal cache.

In various embodiments of the present disclosure, the recipient client (e.g., the second client computing device 14*b*/200*b*) may determine that it is available to receive a peer-to-peer initiation signal before the initiator client (e.g., the first client computing device 14*a*/200*a*) sends the offer signal. In this scenario, the second client computing device 14*b*/200*b* may first check the local signal cache 216*a* for the peer-to-peer initiation signal and then await a peer-to-peer initiation signal from the first client computing device 14*a*/200*a*. When the peer-to-peer initiation signal arrives, the second client computing device 14*b*/200*b* may immediately process the peer-to-peer initiation signal according to block 512 of process 500 without storing the offer signal in the local signal cache.

If, at decision block 508, it is determined that the peer-to-peer condition has been satisfied, then the process 500 may proceed to block 512 where the peer-to-peer connection initiation signal is processed. In an embodiment, at block 512, the second client computing device 14*b*/200*b* may process the peer-to-peer connection initiation signal and respond, at block 514, via the relay server 16 with a peer-to-peer connection response signal to the first client computing device 14*a*/200*a*. In various embodiments, once the second client computing device 14*b*/200*b* is available, the second client computing device 14*b*/200 may check the local signal cache 216*a* to determine whether the initiator identifier associated with the first client computing device 14*a*/200*a* includes a peer-to-peer connection initiation signal and, if so, proceed to block 514. For example, when the peer-to-peer condition has a been satisfied, the second client computing device 14*b*/200*b* will know to listen for a peer-to-peer initiation signal from the first client computing device 14*a*/200*a* that may be identified by an identifier. As such, the second client computing device 14*b*/200*b* checks whether any peer-to-peer connection initiation signals have been cached in the local signal cache 216*n* and processing those signals when the peer-to-peer condition is satisfied (e.g., being in a proximity range of the client computing devices associated with the cached signal).

In various embodiments, at block 514, the peer-to-peer connection response signal may include an SDP answer or any other response signal that would be apparent to one of skill in the art in possession of the present disclosure. The first client computing device 14*a*/200*a* may receive the peer-to-peer connection response signal and process the response signal to establish a peer-to-peer connection at block 516 (e.g., a real-time connection using WebRTC). At block 518, one or more media streams (e.g., a video stream, an audio stream, an audiovisual stream or other media content stream) may then be provided on that peer-to-peer connection between the first client computing device 14*a*/200*a* and the second client computing device 14*b*/200*b*.

In some embodiments, the first client computing device 14*a*/200*a* may determine that the peer-to-peer connection condition no longer exists while it waits for the peer-to-peer connection response signal. As such, the first client computing device 14*a*/200*a* may ignore the peer-to-peer connection response signal that is received from the second client computing device 14*a*/200*a* or disconnect the peer-to-peer connection after it is established. In some embodiments, once the peer-to-peer connection is established, the peer-to-peer connection may be disconnected when the peer-to-peer connection condition is not satisfied (e.g., once the participants move away from each other such that the proximity value does not satisfy the proximity condition).

Figure 6:
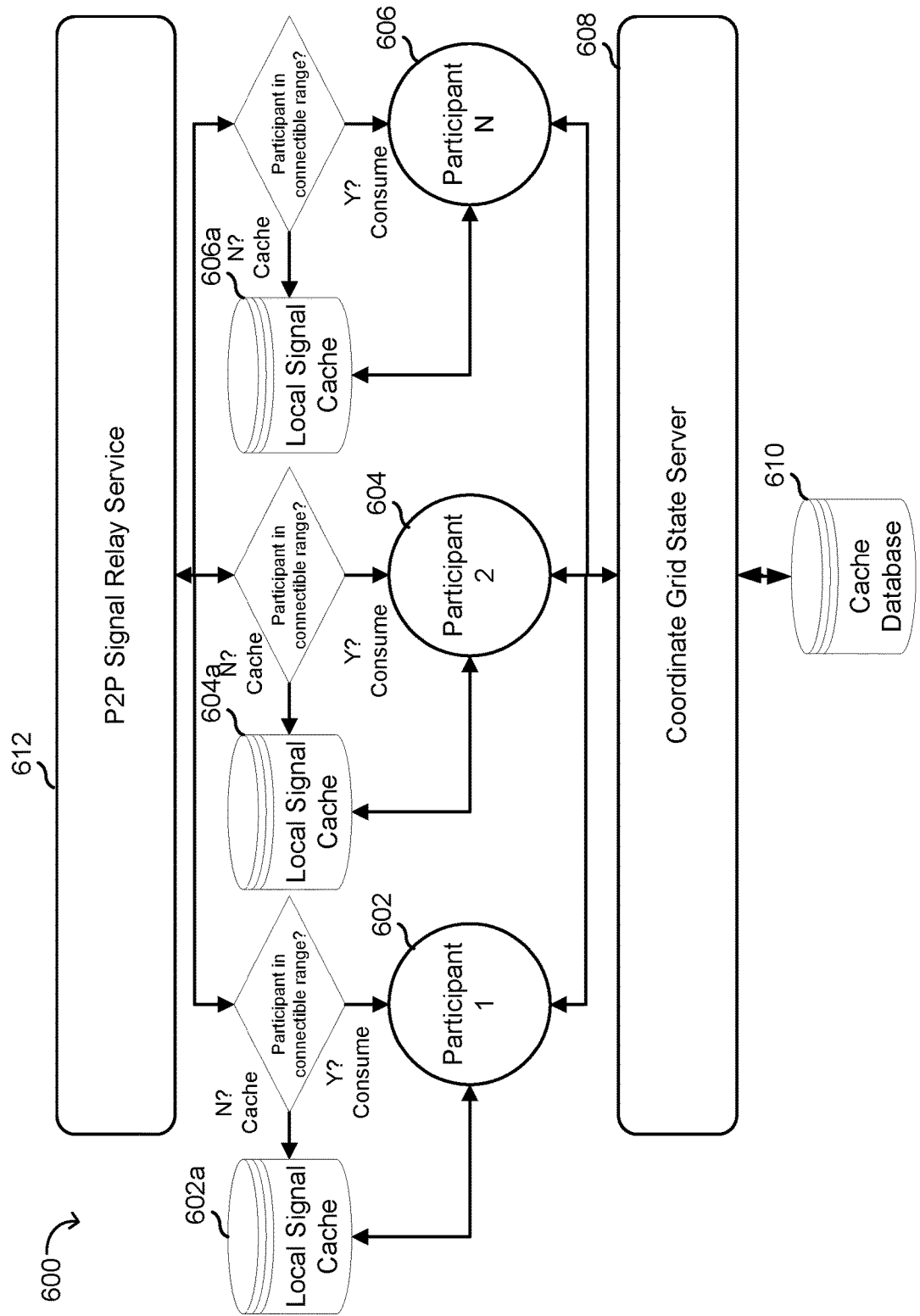
FIG. 6 illustrates a block diagram of an example of the process of FIG. 4 and FIG. 5, in accordance with some embodiments of the present disclosure.

FIG. 6 illustrates an example of a peer-to-peer signal caching system 600 which may be provided by the computer system 10 and illustrates an example of processes 400 and 500 discussed above. Each participant 602, 604, and up to 606 may communicate position information to the coordinate grid state server 608 (e.g., the server 12/300). The position information may include a current position, a user input next position, and the time of the user input. The coordinate grid state server 608 may store position information of each participant 602-606 in the cache database 610 and provide a current participant state (position) payload from the cache database 610 to the participants 602-606. The cache database 610 may only require a single data point to distribute that info to every other participant through the coordinate grid state server 608. Each participant 602-606 may calculate every other participant's current position based on the line drawn by the two coordinates of the participants (e.g., participant 602 and participant 604) and the time of the user input, given a constant speed.

Because each participant 602, 604, and 606 determines a coordinate grid state on their own using the participant state payload provided by the coordinate grid state server 608 (e.g., the server 12) that keeps an updatable participant state payload in the cache database 610, the participant 602 may determine they are within connectible distance to participant 604 sooner than participant 604 determines that participant 602 is within connectible distance. This means that the participant 602 may send a peer-to-peer connection initiation signal via the peer-to-peer signal relay services (e.g., provided by the relay server 16) before the participant 604 is ready to consume it. The participant 604 may store the peer-to-peer connection initiation signal in its local signal cache 604a. Similarly, participant 602 may store a peer-to-peer connection initiation signal in local signal cache 602a and the participant 606 may store a peer-to-peer connection initiation signal in the local signal cache 606a if they receive the peer-to-peer connection initiation signal before that participant 602 or 606 is ready to consume the peer-to-peer connection initiation signal from that participant that sent the peer-to-peer connection initiation signal.

Thus, systems and methods of the present disclosure provide for peer-to-peer caching when a coordinate grid state for a participant in a coordinate grid environment is determined by each participants' associated computing device rather than a state server and that coordinate grid state is used to determine whether a peer-to-peer connection should be established between participants. As discussed above, the participants may determine a coordinate grid state at different times which may cause a client computing device to miss a peer-to-peer connection initiation signal (e.g., if that client computing device has not determined that it is in proximity to another client computing device that has determined that participants of the two client computing devices are in proximity to one another. This allows for mesh networks of coordinate grid environments with peer-to-peer connections such that the scale of the coordinate grid environment can host hundreds, thousands or tens of thousands of participants and those participants are allowed to communicate with each other when they are in proximity to each other while capping the number of participants it can communication with.

Client Authoritative Coordinate Grid State Distributed Over Peer-to-Peer Connections As discussed above, participant state information may be provided to the coordinate grid state server. The coordinate grid state server may compile at least a portion of the participant state information and distribute the participant state information in a participant state payload. The participant state information may include participant position information from which each participant determines a coordinate grid state for the participants within the coordinate grid. The participant position information may include a position of a participant, a user input position, and a time of the user input from which a distance or coordinate grid state can be determined between participants. The distance may be used to determine whether a peer-to-peer connection should be established by satisfying a proximity condition. Using a local signal cache to cache peer-to-peer connection initiation signals, because participants generating their own coordinate grid states may occur at different times, the participants may facilitate peer-to-peer connections. In addition to participant position information being provided to the coordinate grid state server, other participant state information may be provided to the coordinate grid state server. However, providing the participant state information constantly via the coordinate grid server may be inefficient with respect network, processing, and memory resources.

In various embodiments of the present disclosure, once participants in a coordinate grid environment provided by an application are connected to each other via peer-to-peer channels or connections, each participant may pass participant state information or participant state changes to a connected participant when something about their own state changes or when that participant connects to another new participant. The participant that receives the state change may relay that state change to other peer-to-peer connected participant. If another connected participant has received a state change from the initial participant and a has received a relay message. The participant will ignore the relay message. In some embodiments, the participant may ignore the relay message that has the most hops, the relay message that is received last, or based on any other condition that may be apparent to one of skill in the art.

In various embodiments, multiple independent mesh networks of participants that are in a coordinate grid environment may be formed where there is no peer-to-peer connection between the two independent meshes of participants. When a new participant enters a mesh, that participant gives the participant states that it is tracking to the participant that was already in the mesh. The participant that is in the mesh may provide the participant states that it is tracking to the new participant of the mesh. As such, the new participant and the existing mesh participant would merge their exchanged state databases together. The existing mesh participant would relay the new participant's participant states to the participants in the mesh that it is connected to and so on until all participants in the mesh have the participant state information of the new participant.

In some embodiments, not all state changes will be communicated to all participants. In some embodiments, a state change of one participant may only affect one of the participants and none of the others. For example, if the participants are in a paintball game, a first participant may shoot a second participant. The act of shooting by the first participant may provide a state change to the world. For example, the act of shooting may generate a visualization in the world of the shot of the paintball, which would need to be communicated to all of the other participants in the mesh such that those participants may view the shot of the paintball in a visualization. However, in other embodiments, the shot of the paintball may not be associated with a visualization. As such, only the second participant that is shot and that would receive a deduction in health or hit points as a result of the shot would need to receive the state change generated by the first participant. In response to being shot, the second participant may experience a state change of a reduction in health or hit points and generate a state change communication to send to connected participants. As such, the peer-to-peer application may be configured such that a state change is communicated based on a state change condition being satisfied (e.g., a global visualization associated with the state change or only local knowledge). Otherwise, to conserve network and processing resources, state changes may not be communicated if there is no effect on the other participants or only be sent to a first set of participants and not a second set of participants where the state change of the first participant affects the first set of participants but not the second set of participants.

In various embodiments, a participant keeps all participant states that the participant knows even if the participant becomes disconnected from a mesh or another participant becomes disconnected from the mesh. The participant sends the other participant's participant state until the participant receives a new participant state for the other participant. When participant states are received by a participant, the participant will check timestamps to determine whether the received participant state is newer than the stored participant state. If the received participant state is newer, the participant will update the participant state for the other participant with received participant state. Otherwise, the participant will maintain the participant state it already has stored if the received participant state is older.

Figure 7:
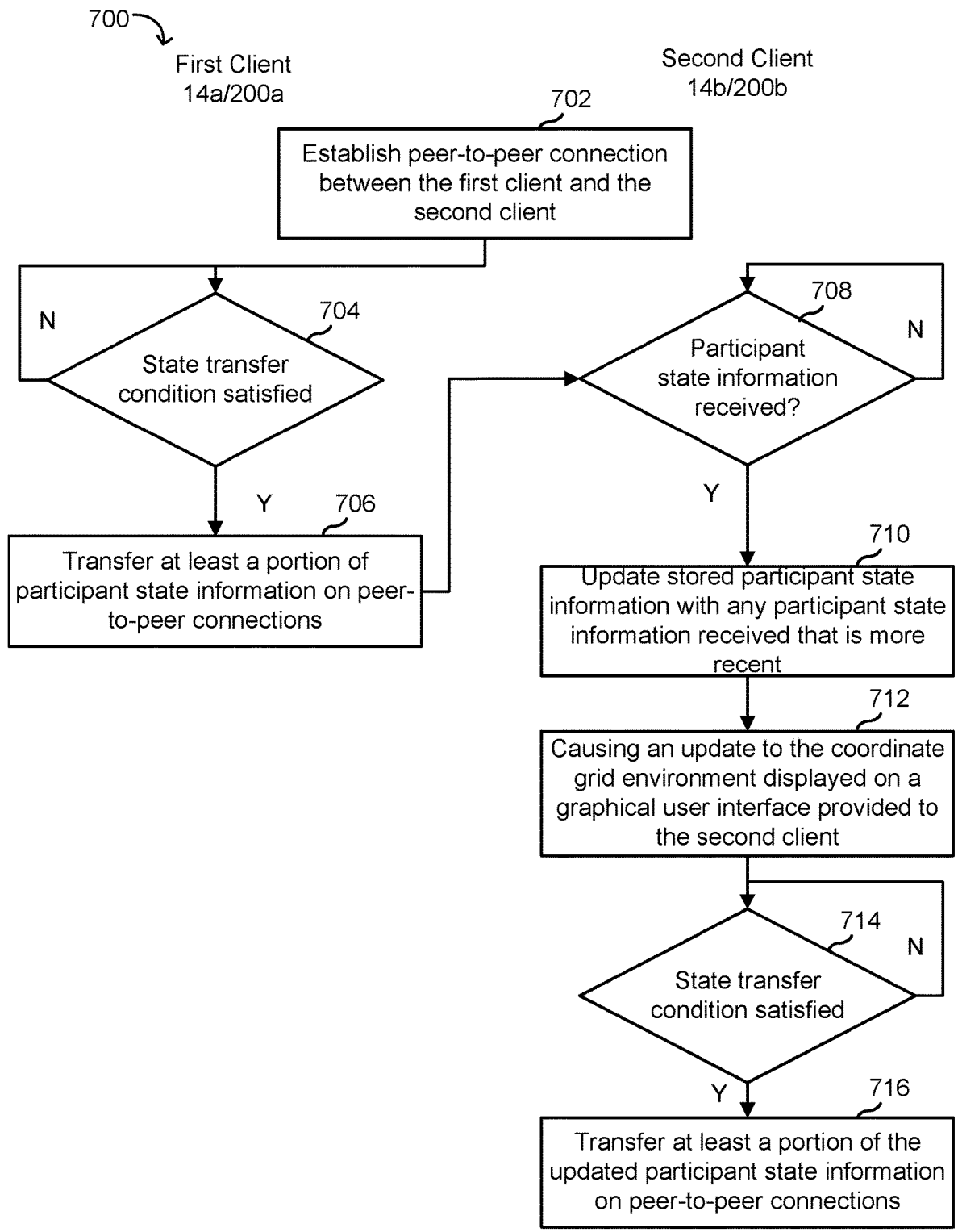
FIG. 7 illustrates a flowchart of a process of participant state information being provided via peer-to-peer connections performed by the computing environment of FIG. 1, in accordance with some embodiments of the present disclosure.

In some embodiments, the server 12, the relay server 16, or the clients 14 may execute a process 700 of FIG. 7, for example, by executing program code stored on a tangible, non-transitory, machine-readable medium. The illustrated operations may be executed in a different order, omitted, replicated, executed concurrently, executed serially, have additional operations inserted, all be automated, involve human intervention, or otherwise be modified relative to the arrangement depicted, which is not to suggest that any other description herein is limiting.

In some embodiments, the process 700 is illustrated in FIG. 7. The process 700 may begin at block 702 where a peer-to-peer connection between a first client computing device and a second client device is established. In an embodiment, at block 702, the peer-to-peer connection between the first client computing device 14a/200a and the second client computing device 14b/200b may be established. The establishment of the peer-to-peer connection may be established according to the processes 400 and 500 described above in FIG. 4 or FIG. 5. However, in other embodiments, the peer-to-peer connection may be established according to other processes that would be apparent to one of skill in the art in possession of the present disclosure. In various embodiments, the first client computing device 14a/200a or the second client computing device 14b/200b may each establish a plurality of peer-to-peer connections each with a respective client computing device. As such, for example, the first client computing device may establish a second peer-to-peer connection with a third client computing device, a third peer-to-peer connection with a fourth client computing device, a fourth peer-to-peer connection with a fifth client computing device and so on until a maximum peer-to-peer connection limit is reached, which may be based on performance, a system definition, or client computing device capabilities.

In reference to the embodiments described in the process 400 and the process 500, the establishment of the peer-to-peer connection may occur when a first participant that is in a coordinate grid environment provided by the peer-to-peer applications 204c or 304a and that is associated with the first client computing device 14a/200a satisfies a proximity condition with a second participant that is in the coordinate grid environment and that is associate with the second client computing device 14b/200b. As such, the state server computing device 12/300 may provide participant state information (e.g., participant position information) to each of the participants in the coordinate grid environment and each participant may be able to calculate the distance and position or other coordinate grid states of each participant from that participant state payload. However, in other embodiments of the present disclosure and discussed in detail below, each of the participants may belong to the same mesh network of peer-to-peer connected participants. For example, the first client computing device 14a/200a and the second client computing device 14b/200b may be connected to each other via one or more intermediary client computing devices. Based on shared participant state information provided through the peer-to-peer connections of the mesh network, the first client computing device 14a/200a and the second client computing device 14b/200b may obtain each other's participant position information and determine that they are in proximity to each other such that the peer-to-peer connection may be established.

In some instances, at least the participant position information of the participant state information needs to be communicated to a state server computing device 12/300. For example, if the first participant of the first client computing device 14a/200a joined the coordinate grid environment, none of the other participants would have knowledge of that first participant's position in the coordinate grid environment nor would the first participant have any knowledge of the other participants' position in the coordinate grid environment. In another situation, multiple mesh networks may operate in the coordinate grid environment without an intermediary participant. As such, as the participants of each mesh move about the coordinate grid environment, those participants of each mesh network may not be aware of the participants' locations in the other mesh network making it difficult to determine a current location of each participant between the mesh networks such that a proximity condition is satisfied to establish the peer-to-peer connection.

The process 700 may proceed to decision block 704 where a determination is made whether a state transfer condition exists. In an embodiment, at decision block 704, the first client computing device 14a/200a may determine whether a state transfer condition is satisfied such that the first client computing device 14a/200a initiates a transfer of stored participant state information 216c. The participant state information may include participant state information for the participants in the coordinate grid environment. As discussed above, the participant state information may include participant position information but may also include other state information for determining truth in the coordinate grid environment. For example, the participant state information may include participant health, abilities, virtual items associated with the participant, speed, appearance, blockchain wallet identifiers, token identifiers, or other attributes/states that may be updateable. In various embodiments, the state transfer condition may be satisfied when the first participant changes one or more states such that the participant state information for the first participant is updated. In another embodiment, the state transfer condition may be satisfied when the first client computing device 14a/200a detects a state change or causes a state change to another participant in the coordinate grid environment. The detection of a state change may include receiving participant state information from another client computing device on a peer-to-peer connection with that client computing device that updates at least one data entry in the participant state information 216c. If no state transfer condition is satisfied, the first client computing device will continue to monitor for a state transfer condition to be satisfied at decision block 704.

If the state transfer condition is satisfied at decision block 704, the process 700 may proceed to block 706 where at least a portion of the participant state information stored on the first client computing device is provided on at least a portion of the peer-to-peer connections that the first client computing device 14a/200a has established. In an embodiment, at block 706, the first client computing device 14a/200a may provide at least a portion of its participant state information 216c to other client computing devices connected to the first client computing device 14a/200a via peer-to-peer connections. For example, at least a portion of participant state information 216c may be provided through the peer-to-peer connection with the second client computing device 14b/200b. However, in some embodiments, the participant state information may not be transferred on a portion of the peer-to-peer connections hosted by the first client computing device 14a/200a. For example, if the reason for the transmission of participant state information is based on participant state information received via a peer-to-peer connection, the participant state information may not be provided via that peer-to-peer connections whose communications caused the participant state information to be transmitted. This may prevent looping the state information via the peer-to-peer connection. However, in other embodiments, the participant state information may be provided through all the peer-to-peer connections and other mechanisms may be in place to prevent looping of the participant state information on the peer-to-peer connections.

In some embodiments, all participant state information 216c may be transferred via the peer-to-peer connections. In other embodiments, only a delta from an update in the participant state information may be transferred via the peer-to-peer connections. In yet other embodiments, certain participant state information based on type of information may be transferred while another type of participant state information may not be transferred. For example, a participant health information may be transferred while participant position information may not be transferred. In yet other embodiments, participant state information that is associated with as certain group of participants may be transferred while participant state information associated with another group of participants may not be transferred.

The process 700 proceeds to decision block 708 where the second client computing device is monitoring whether it has received any participant state information via its peer-to-peer connections. In an embodiment, at decision block 708, the second client computing device 14b/200b (although the first client computing device 14a/200a may also be performing this step as well) may monitor for any participant state information received on its established peer-to-peer connections. The process 700 may return to decision block 708 if no participant state information has been received.

However, if participant state information has been received at decision block 708, the process 700 may proceed to block 710 where stored participant state information is updated with any participant state information that is more recent. In various embodiments, at block 710, the second client computing device 14b/200b may determine whether to update any of its participant state information 216c. The second client computing device 14b/200b may compare each participant state information entry for each participant that it has in the participant state information 216c to the participant state information that it received via the peer-to-peer connection. For example, the second client computing device 14b/200b may compare the participant entry for the first participant in the participant state information 216c to the participant state information that it received for the first participant from the first client computing device 14a/200a or other client computing device. The second client computing device 14b/200b may compare timestamps to determine which participant state entry is most recent. If the participant state information that is received is more recent than the participant state information that is stored, that participant state information that is more recent may be used to update that portion of the participant state information 216c that the second client computing device 14b/200b is maintaining.

The process 700 may proceed to block 712 where the updated participant state information may cause a change in I/O device output associated with the second client computing device. In an embodiment, at block 712, the updated participant state information may cause an output to be generated via the user I/O system 218 or the display system 220. For example, the participant state information may have included a participant position information that was updated for the first participant. As such, the peer-to-peer application 204c or 304a may cause a graphical user interface that includes a visual representation of the first participant to move via the display system 220 of the client computing device 14b/200b. In other embodiments, the updated participant position information may have been for a third participant whose third client computing devices is upstream from the second client computing device 14b/200b via the first client computing device 14a/200a. As such, if the position information now indicates that the third participant is entering a viewpoint of the coordinate grid environment displayed on the second client computing device 14b/200b, that coordinate grid environment may cause the display system 220 to display the third participant moving into the coordinate grid environment displayed by the second client computing device. While particular examples of providing a change in I/O device output are illustrated, other I/O device outputs may be contemplated and still fall under the scope of the present disclosure.

The process 700 may proceed to decision block 714 where it is determined whether a state transfer condition is satisfied. In an embodiment, at decision block 714, the second client computing device 14b/200b may determine whether a state transfer condition is satisfied. Decision block 714 may operate similarly to decision block 704 by the first client computing device, and thus will not be discussed again in detail.

The process 700 may then proceed to block 716 when the state transfer condition is satisfied in decision block 714. At block 716, the second client computing device may transfer at least a portion of the updated participant state information on peer-to-peer connections. The operations of block 716 may operate similarly to the operation of block 706, and thus will not be discussed again in detail. As such, the second client computing device 14b/200b may provide its participant state information to the first client computing device 14a/200a via the peer-to-peer connection and the first client computing device 14a/200a may complete the operations in blocks 708-712 before returning to decision block 704. Similarly, the second client computing device 14b/200b may provide its participant state information to another client computing device 14a/200a via another peer-to-peer connection.

Figure 8:
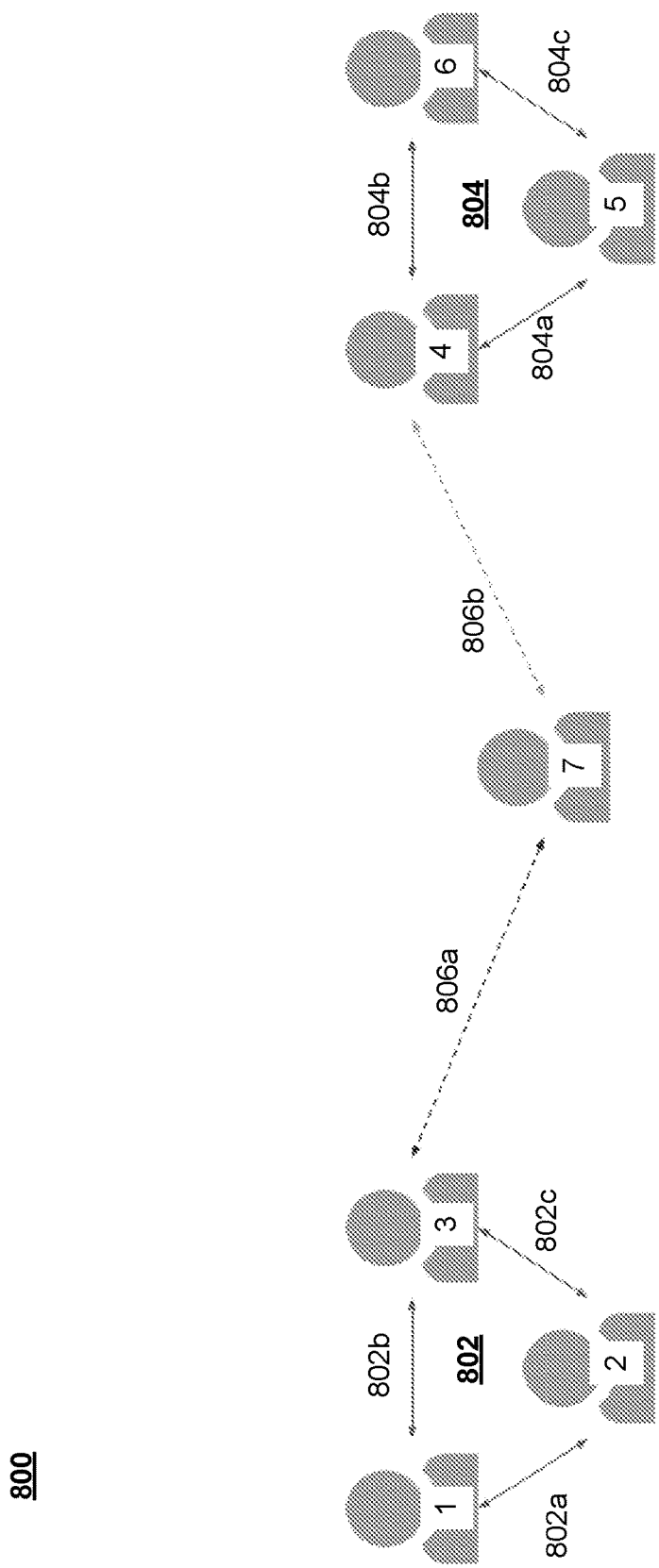
FIG. 8 illustrates a block diagram of an example of the process of FIG. 7, in accordance with some embodiments of the present disclosure.

FIG. 8 illustrates an example coordinate grid environment 800, according to various embodiments of the present disclosure. The coordinate grid environment 800 or virtual world may include two multi-participant, closed, mesh networks, 802 and 804. The mesh network 802 may include participants 1, 2, and 3 that are each connected to each other via a peer-to-peer connection 802a, 802b, and 802c. The mesh network 804 may include participants 4, 5, and 6 that are each connected to each other via a peer-to-peer connections 804a, 804b, and 804c. Initially, participant 7 stands alone and may be considered a third "mesh network". In both mesh networks 802 and 804, all participants are interacting with each other and passing participant state information to indicate changes in participant states to one another when something about their own state changes or some other state transfer condition is satisfied. For example, if participant 2 updates some information about themselves, participant 2 will send a timestamped update to every other participant they are connected to (e.g., participant 1 and participant 3). Participant 1 and 3 would relay this information to all other participant they are connected to but participant 3 would ignore participant 1's relay of participant 2's update because participant 3 is connected to and already has or will receive it from participant 2. Participant 1 would do the same with participant 3's relay. Participants 1 and 3 may distinguish the relayed information from other relays based on the time stamp and where the information originated.

In the illustrated example, participant 7 may be independently moving between the mesh networks 802 and 804. At some point, participant 7 and participant 3 may establish a peer-to-peer connection 806a as described above. Participant 3 would still be part of mesh network 802 but with an peer-to-peer connection 806a to participant 7. Participant 7 may join the mesh network 802. The following may happen upon connection: (1) Participant 7 may provide participant 3 at least a portion of participant state information that participant 7 is tracking. Participant 3 may provide participant 7 with at least a portion of participant state information that participant 3 is tracking. Participants 7 and 3 would each merge their exchanged state databases together. Now participant 7 would know everything participant 3 knows and participant 3 would know everything participant 7 knows.

Subsequently, if participant 7 that is connected to participant 3 decides to connect to participant 4 and participant 4 reciprocates via a peer-to-peer connection 806b. Participant 4 and participant 7 may exchange each other's participant state databases (e.g., participant state information) the way participant 7 and participant 3 already did above. As such, participant 7 may now be aware of information participant 4 is aware of and vice versa. In addition, participant 7 may relay any new information received from participant 4 onto participant 3. Participant 3 will do the same with the new participant state information received from participant 7 such that participant 1 and participant 2 will receive the new information. Similarly, participant 4 may relay some or all the new participant state information received from participant 7 to participant 6 and participant 5.

At the end of the merges and relays, all participants (e.g., participants 1-7) spanning from mesh network 802 and 804 through participant 7 are now aware and agree on the participant position information or the coordinate grid state of all other participants. This exchange of information may occur without the need of a central server.

Thus, the peer-to-peer mesh technology of the present disclosure allows for peer-to-peer connections between peers to fluidly come in and out of existence. This peer-state-exchange mechanism allows for game-like state to be shared among all participants of a large world. The use of peer-to-peer connections allows for coordinate grid states like this to propagate throughout super massive worlds/coordinate grids without requiring the overhead of a state server computing device for at least a portion of the participant state information.

Mixed Peer-to-Peer Mesh and SFU Stream Distribution

As discussed above, there are increasingly common applications for streaming both video and audio between participants in certain application environments. As populations of the application instances grow, it becomes harder to reliably sustain connections between subsets of participants. There is little need to maintain streams between all participants, but proximate connections are very valuable in many circumstances.

A peer-to-peer mesh topology can adequately and inexpensively connect subsets of the instance population but there remains the challenge of distributing single streams to larger numbers of people. A world event may want to run an announcement to the entire world. Peer-to-peer has its limitations. A single client can only maintain upwards of 10 streams simultaneously due to encoding processing and upload bandwidth limitations. Streaming servers (e.g., an SFU) mixed with peer-to-peer may help bridge this gap.

Running a world event and utilizing peer-to-peer mesh for most smaller group interactions is efficient and inexpensive. However, there are situations when distribution of one or more streams to all users within a world or a zone of a world is necessary or valuable. Peer-to-peer mesh streaming may be insufficient for streaming instances to large numbers of participants (e.g., more than 10 users, at least 15 users, at least 20 users, at least 50 users, at least 100 users, at least 1,000 users, at least 10,000 users, or any other number of users that would be apparent to one of skill in the art in possession of the present disclosure where a threshold quality degradation level is satisfied. For example, most client computing devices are not designed to simultaneously stream to more than just a few peers on over peer-to-peer connections. Reaching an audience in the hundreds or thousands of viewers of a single stream benefits from a Selective Forwarding Unit (SFU).

Thus, the systems and methods of the present disclosure provide for knowing when to utilize the SFU to publish streams and when to fetch streams from the SFU versus establishing peer-to-peer connections and streaming through those peer-to-peer connections. Knowing when to utilize SFU and peer-to-peer provides network efficiencies for the distribution of streams in a fluid environment.

For example, each participant in the coordinate grid environment may be in: (1) a base state, (2) a broadcasting state, (3) a screen sharing state, or any other state that would be apparent to one of skill in the art in possession of the present disclosure. A participant that is in the base state may only connect to those participants around them. This participant may connect via peer-to-peer connection to each other participant in their proximity, which may be according to the signal caching method discussed above in processes 400 of FIG. 4 and 500 of FIG. 5. Furthermore, the participant that is in the base state may upload their audio or video stream through this peer-to-peer connection. In various embodiments, a participant that is in the base state may read the stream of each participant around them depending on the state of each other participant. If a nearby participant is also in a base state, then the participant will read a stream from the peer-to-peer connection with the nearby participant. If a nearby participant is in a broadcasting state or a screen sharing state then this participant may read the stream from the SFU.

As discussed above, in some instances, a participant may be in a broadcasting state. A participant in the broadcasting state may provide a stream that will be seen/heard by more than those around them. In some embodiments, if a participant is broadcasting then that participant may upload their stream to the SFU. In various embodiments, a broadcasting participant may also establish a peer-to-peer connection with every nearby participant, which may be performed according to the signal caching method described above in process 400 and 500. Participant state information that may include the communication mode that the participant in (e.g., base state, broadcasting state, or screen sharing state) may be transferred to each participant via a state server computing device or according to the process 700 of FIG. 7 discussed above. In various embodiments, the broadcasting participant, since they are uploading their stream to the SFU, may not be required to upload their stream to the peer-to-peer connection and each nearby participant will know to fetch the broadcasting participant's stream from the SFU. If a nearby participant is not in a broadcast state or a screenshare state, as discussed in further detail below, the nearby participant will flow to the broadcasting participant through the established peer-to-peer stream.

In some instances, a participant may be in a screen sharing state. In some embodiments, a stream of the participant that is in the screen sharing state may be distributed if the stream is at a high enough quality for the stream to be legible. If any participant is sharing their screen, that stream is uploaded to the SFU and distributed from the SFU, similar to broadcast mode.

In various embodiments, each participant may know of the current participant state of every other participant in the world through the participant state information exchange discussed herein.

Figure 9:
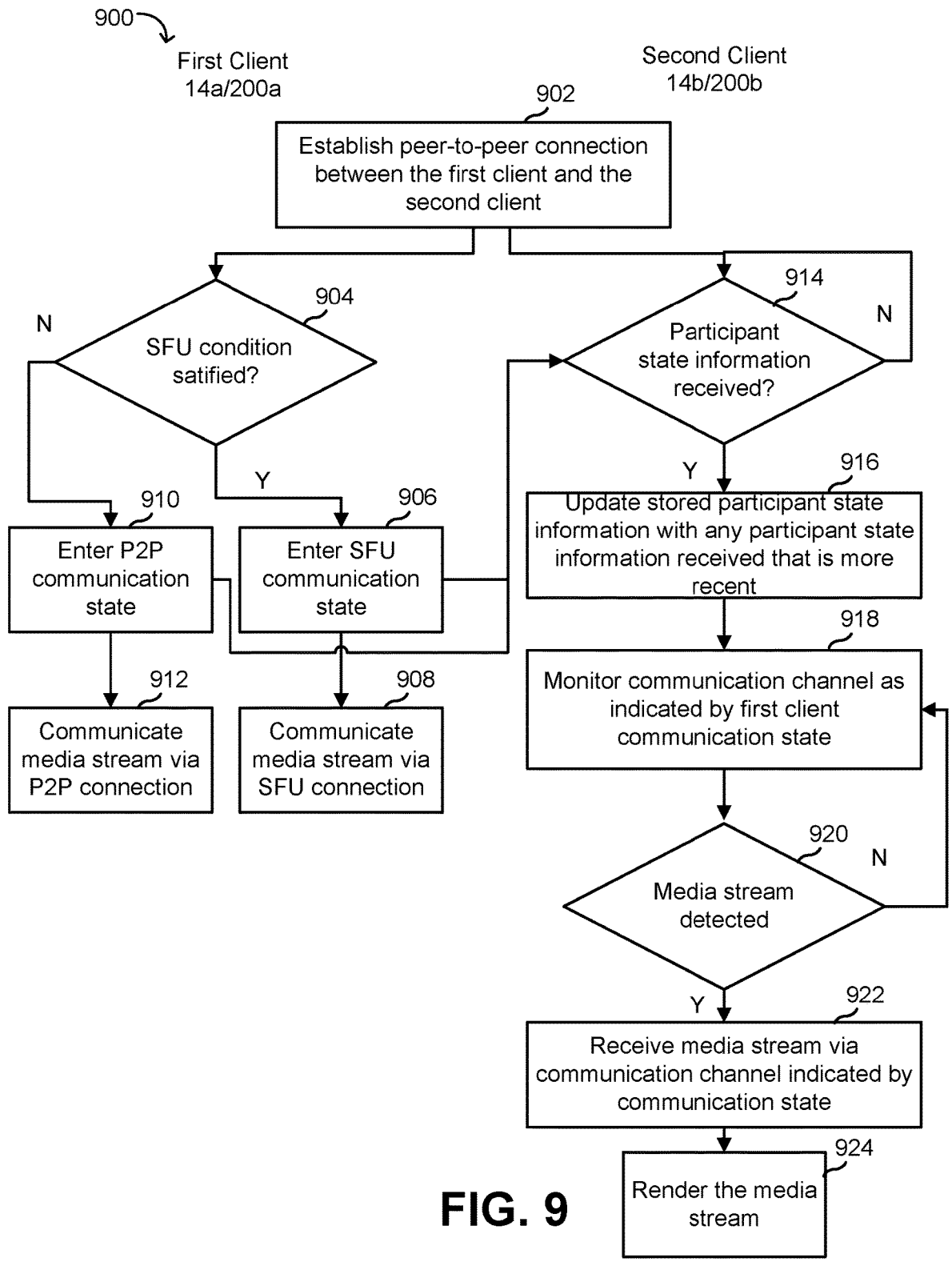
FIG. 9 illustrates a flowchart of a process of mixed peer-to-peer and selective forwarding unit media streaming performed by the computing environment of FIG. 1, in accordance with some embodiments of the present disclosure.

In some embodiments, the server 12, the relay server 16, the clients 14, or the selective forwarding unit server 18 may execute a process 900 of FIG. 9, for example, by executing program code stored on a tangible, non-transitory, machine-readable medium. The illustrated operations may be executed in a different order, omitted, replicated, executed concurrently, executed serially, have additional operations inserted, all be automated, involve human intervention, or otherwise be modified relative to the arrangement depicted, which is not to suggest that any other description herein is limiting.

In some embodiments, the process 900 is illustrated in FIG. 9. The process 900 may begin at block 902 where a peer-to-peer connection between a first client computing device and a second client device is established. In an embodiment, at block 902, the peer-to-peer connection between the first client computing device 14a/200a and the second client computing device 14b/200b may be established. The establishment of the peer-to-peer connection may be established according to the processes 400 and 500 described above in FIG. 4 or FIG. 5. However, in other embodiments, the peer-to-peer connection may be established according to other processes that would be apparent to one of skill in the art in possession of the present disclosure. In various embodiments, the first client computing device 14a/200a or the second client computing device 14b/200b may each establish a plurality of peer-to-peer connections each peer-to-peer connection with a respective client computing device. As such, for example, the first client computing device may establish a second peer-to-peer connection with a third client computing device, a third peer-to-peer connection with a fourth client computing device, a fourth peer-to-peer connection with a fifth client computing device and so on until a maximum peer-to-peer connection limit is reached, which may be based on performance, a predetermined or dynamic system limit, or client computing device capabilities.

In reference to the embodiments described in the process 400 and the process 500, the establishment of the peer-to-peer connection may occur when a first participant that is in a coordinate grid environment provided by the peer-to-peer applications 204c or 304a and that is associated with the first client computing device 14a/200a satisfies a proximity condition with a second participant that is in the coordinate grid environment and that is associated with the second client computing device 14b/200b. As such, the state server computing device 12/300 may provide participant state information (e.g., participant position information) to each of the participants in the coordinate grid environment and each participant may be able to calculate the distance and position or other coordinate grid states of each participant from that participant state payload. However, in other embodiments of the present disclosure and discussed in detail above with reference to process 700 of FIG. 7, each of the participants may belong to the same mesh network of peer-to-peer connected participants. For example, the first client computing device 14a/200a and the second client computing device 14b/200b may be connected to each other via one or more intermediary client computing devices. Based on shared participant state information provided through the peer-to-peer connections of the mesh network, the first client computing device 14a/200a and the second client computing device 14b/200b may obtain each other's participant position information and determine that they are in proximity to each other such that the peer-to-peer connection may be established.

The process 900 may proceed to decision block 904 where a determination is made whether a selective forwarding unit condition is satisfied. In an embodiment, at decision block 904, the first client computing device 14a/200a may determine whether a selective forwarding unit condition is satisfied such that the first client computing device 14a/200a provides a media stream via the selective forwarding unit 18 when the selective forwarding unit condition is satisfied or the first client computing device 14a/200a provides a media stream via a peer-to-peer connection when the selective forwarding unit condition is not satisfied. For example, and as discussed above, media streams that are to reach a large group of participants in the coordinate grid environment, that require a high quality, or some other condition may be better transmitted via a selective forwarding unit 18 than peer-to-peer connections. As such, at decision block 904, the first client computing device 14a/200a may be monitoring media streams and transmission information associated with the media stream to determine whether the number of participants for which the media stream is destined exceeds a participant threshold, whether the media stream exceeds a quality threshold that cannot be satisfied by a peer-to-peer connection, or some other selective forwarding unit condition that would be apparent to one of skill in the art in possession of the present disclosure.

If, at decision block 904, it is determined that the media stream does satisfy the selective forwarding unit condition, the process 900 may proceed to block 906 where the first client computing device enters a selective forwarding unit state. In an embodiment, at block 906, the first client computing device 14a/200a may update a communication state to a selective forwarding unit state. In some embodiments, the selective forwarding state may include a broadcasting state for instances when the media stream exceeds a participant threshold. In other embodiments, the selective forwarding state may include a screen sharing state for instances when the media stream satisfies a quality threshold. In various embodiments, a change in communication states identified in the participant state information may cause a state transfer condition to be satisfied in decision block 704 of process 700 of FIG. 7. As such, the communication state change for the first client computing device 14*a*/200*a* may be communicated to other participants and their associated client computing devices according to the process 700 of FIG. 7 via peer-to-peer connections. However, in other embodiments, the participant state information may be distributed to the participants of the coordinate grid environment via a state server computing device in a participant state payload 308*a*, as discussed above in the process of FIG. 4.

The process 900 may proceed to block 908 where the first client computing device provides the media stream via a selective forwarding unit connection with the selective forwarding unit. In an embodiment, at block 908, the first client computing device 14*a*/200*a* may provide the media stream via the communication system 210 to the selective forwarding unit 18. The selective forwarding unit 18 may provide the media stream to the participants of the coordinate grid environment identified in the broadcast. In some embodiments, the participants may be a portion of a plurality of participants in the coordinate grid environment. For example, when the first client computing device 14*a*/200*a* is in a broadcast state, the selective forwarding unit 18 may provide the media stream to all the participants in the coordinate grid environment or a portion of the participants in the coordinate grid environment that exceeds the peer-to-peer connection maximum. In another example, when the first client computing device 14*a*/200*a* is in the screen sharing state, the selective forwarding unit 18 may provide the media stream to all the participants in the coordinate grid environment or a portion of the participants in the coordinate grid environment that may or may not exceed the peer-to-peer connection maximum since the screen sharing state is based on quality.

Referring back to decision block 904, if the selective forwarding unit condition is not satisfied, the process 900 may proceed to block 910 where the first client computing device may enter a peer-to-peer connection communication state. In an embodiment, at block 910, the first client computing device 14*a*/200*a* may update a communication state to a peer-to-peer connection communication state when the selective forwarding unit condition is not satisfied. The peer-to-peer communication state may be referred to as a base state and may be a default state of the first client computing device. As such, the communication state may only be updated if the first client computing device 14*a*/200*a* was not in a base state to begin. In various embodiments, a change in communication states identified by the participant state information may cause a state transfer condition to be satisfied in decision block 704 of process 700 of FIG. 7. As such, the communication state change for the first client computing device 14*a*/200*a* may be communicated to other participants and their associated client computing devices according to the process 700 of FIG. 7 via peer-to-peer connections. However, in other embodiments, the participant state information may be distributed to the participants of the coordinate grid environment via a state server computing device in a participant state payload 308*a*, as discussed above in process 400 of FIG. 4.

The process 900 may proceed to block 912 where the first client computing device provides the media stream via one or more peer-to-peer connections. In embodiment, at block 912, the first client computing device 14*a*/200*a* may provide the media stream via the communication system 210 to the second client computing device 14*b*/200*b* via the peer-to-peer connection or to other participants in the coordinate grid environment via established peer-to-peer connections between the first client computing device 14*a*/200*a* and other client computing devices.

Blocks 914-924 of process 900 are described from the point of view of the second client computing device 14*b*/200*b*. However, the functionality of the second client computing device 14*b*/200*b* could be performed by the first client computing device 14*a*/200*a* and vice versa. At decision block 914, the second client computing device may be monitoring for participant state information. In various embodiments, at decision block 914, the second client computing device 14*b*/200*b* may be monitoring for participant state information from a state server computing device or another client computing device such as the first client computing device 14*a*/200*a*. If no participant state information has been received, then the second client computing device 14*b*/200*b* may continue to monitor for participant state information. Decision block 914 may operate similarly to decision block 708 of process 700, discussed above. The process 900 may return to decision block 914 if no participant state information has been received.

However, if participant state information has been received at decision block 914, the process 900 may proceed to block 916 (which may be similar to block 710 of process 700 discussed above) where stored participant state information is updated with any participant state information that is more recent. In various embodiments, at block 916, the second client computing device 14*b*/200*b* may determine whether to update any of its participant state information 216*c*. The second client computing device 14*b*/200*b* may compare each participant state information entry for each participant that it has in the participant state information 216*c* to the participant state information that it received via the peer-to-peer connection or the state server computing device. For example, the second client computing device 14*b*/200*b* may compare the participant entry for the first participant in the participant state information 216*c* to the participant state information that it received for the first participant from the first client computing device 14*a*/200*a* when the first client computing device 14*a*/200*a* updated its communication state. The second client computing device 14*b*/200*b* may compare timestamps to determine which participant state entry is most recent. If the participant state information that is received is more recent than the participant state information that is stored, that participant state information that is more recent may be used to update that portion of the participant state information 216*c* that the second client computing device 14*b*/200*b* is maintaining. As such, if the second client computing device 14*b*/200*b* has received a more recent communication state for the first client computing device 14*a*/200*a* than what the second client computing device 14*b*/200*b* has in the participant state information 216*c*, then the second client computing device 14*b*/200*b* may update the participant state information 216*c* with the new state (e.g., a base state, a broadcast state, a screen share state or any other communication state).

The process 900 may proceed to block 918 where the second client computing device may monitor one or more communication channels for media streams according to the communication state for each participant in the coordinate grid environment. In an embodiment, at block 918, the second client computing device 14b/200b may monitor communications channels as indicated by the communication states included in the participant state information 216c. For example, when the communication state for the first client computing device 14a/200a is in the base state, the second client computing device 14b/200b may monitor the peer-to-peer connection between the first client computing device 14a/200a and the second client computing device 14b/200b for media streams. In another embodiment, when the communication state for the first client computing device 14a/200a is in the screen share state or the broadcast state, the second client computing device 14b/200b may monitor a communication channel with the selective forwarding unit 18 for media streams from the first client computing device 14b/200b. In some embodiments, the second client computing device 14b/200b may prevent media streams from the first client computing device 14a/200a when the communication state for the first client computing device 14a/200a is in the broadcast state or the screen sharing state.

The process 900 may proceed to decision block 920 where a determination is made as to whether a media stream is detected by the second client computing device. If no media stream is detected, the process may return to block 918.

However, if, at decision block 920, a media stream is detected at the communication channel for which the second client computing device is monitoring, then the process 900 may proceed to block 922 where the media stream is received via a communication channel indicated by the communication state for that participant. In an embodiment, at block 922, the second client computing device 14b/200b may receive the media stream according to the communication state it has for each participant. For example, if the communication state for the participant in the coordinate grid environment that is associated with the first client computing device 14a/200a indicates a broadcast state or a screen share state, then the second client computing device 14b/200b may receive the media stream via a communication channel in communication with the selective forwarding unit 18. If the communication state for the participant in the coordinate grid environment that is associated with the first client computing device 14a/200a indicates a base state, then the second client computing device 14b/200b may receive the media stream via the peer-to-peer connection between the first client computing device 14a/200a and the second client computing device 14b/200b.

The process 900 may proceed to block 924 where the media stream is rendered or outputted by the second client computing device. In an embodiment, at block 924, the second client computing device 14b/200b via the display system 220 or the user I/O system 218 may output the media stream. For example, an audio stream may be provided via a speaker included on the user I/O system 218. In another example, a video stream may be provided via a display included in the display system 220. However, other media streams may be outputted via other output devices or combination of output devices that are included in the display system 220 or the user I/O system 218 that would be apparent to one of skill in the art in possession of the present disclosure.

Figure 10:
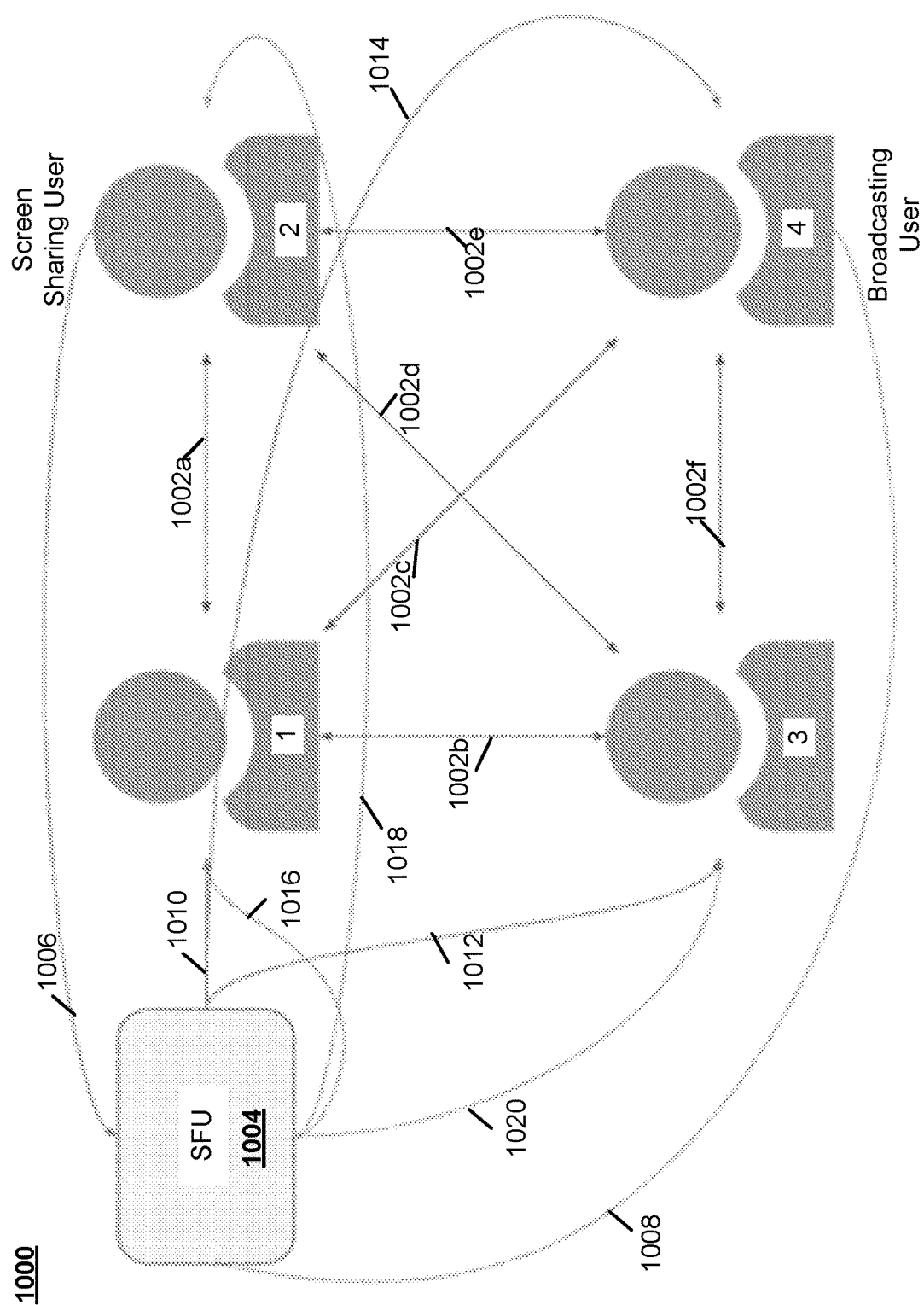
FIG. 10 illustrates a block diagram of an example of the process of FIG. 9, in accordance with some embodiments of the present disclosure.

FIG. 10 is a flow diagram illustrating an example exchange of streams in a mixed use of peer-to-peer and selective forwarding unit streaming environment 1000. In this example, it is assumed all participants in the coordinate grid environment are close enough to connect to each other via a peer-to-peer connection. This means each participant will negotiate a peer-to-peer connection with each other participant, creating a mesh network between the four participants as indicated by peer-to-peer connections 1002a, 1002b, 1002c, 1002d, 1002e and 1002f. Furthermore, in this example, participant 2 is in a screen sharing state, participant 4 is in a broadcasting state, and participants 1 and 3 are in the base state. This means that participant 2 and participant 4 are streaming their audio, video, or other media content to an SFU 1004, as indicated by arrow 1006 and arrow 1008, respectively. Neither participant 2 nor participant 4 is streaming their media streams over the peer-to-peer connections 1002a-1002f that exist between themselves and the other three participants.

However, participant 2 and participant 4 are each downloading media streams from participants 1 and 3 from the peer-to-peer connections 1002a, 1002c, 1002d, and 1002f to those participants. The peer-to-peer connection 1006e between participant 2 and participant 4 has no bytes flowing in either direction. The participants 1 and 3 are each uploading and downloading media streams between each other on peer-to-peer connection 1002b. The participants 1 and 3 are also uploading their media streams to 1002a, 1002c, 1002d, and 1002f.

In various embodiments, participants 1, 3, and 4 that consume streams from participant 2 download those streams from the SFU 1004 as indicated by arrows 1010, 1012, and 1014, respectively. Participants 1, 2, and 3 consume streams from participant 4 as indicated by arrows 1016, 1018, and 1020, respectively.

When either participant 2 or participant 4 stop broadcasting or screen sharing, they will stop uploading streams to the SFU 1004 and will instead upload streams to the peer-to-peer connections 1002a, 1002c, 1002d, 1002e, or 1002f they already have setup. If participant 1 or participant 3 were to begin broadcasting or screen sharing, they would stop uploading their streams to the peer-to-peer connections 1002a, 1002b, 1002c, 1002d, and 1002f and instead upload to the SFU 1004. All other participants in range would then retrieve their new streams from the SFU 1004.

Thus, systems and methods of the present disclosure provide environments to run in peer-to-peer for normal proximate interactions but still utilize an SFU when higher quality is necessary (screen share) or large numbers of stream participants must have access to one participant's stream (broadcast) or non-local participants require the stream.

Peer-to-Peer Mesh Network Bitrate Throttling

As discussed herein, in large population application coordinate grid environments, individual mesh networks are used to connect participants whose distance is close enough to merit a direct peer-to-peer connection. As groups of peer-to-peer connected participants of the coordinate grid environment connect, mesh networks take shape. If these participants are streaming data, like video, between each other, then the processing and bandwidth consumption grows with each new participant added to the mesh. Since each participant in a mesh or in a peer-to-peer pair has different computing and bandwidth capacities, it is important to be able to throttle a maximum bandwidth between each participant as the network size grows and shrinks so that the quality of the streams balances with the quality of the overall experience.

Thus, as the size of a mesh network grows, so do the processing and bandwidth requirements to sustain the mesh. As more participants join a mesh, the stress increases on each individual participant's client computing device and network. Each participant must assess what their capabilities are and throttle their output to sustain all necessary connections.

In various embodiments, of the present disclosure bitrate throttling can be performed as participants enter and exit any given peer-to-peer mesh network. Each participant knows how many other participants they are currently connected to. For example, if participant A and participant B connect to each other, they enter a two-participant mesh network. Each of them can likely stream high quality as they are the only two participants. Specifically, participants A and B may stream video at high quality, 1 MB/s. If participant C enters the range of both A and B the mesh grows to a three-participant network. Participant C may detect the peer-to-peer connections to two others. Participant C may keep their maximum bandwidth consumption below 1 MB/s and thus will cap the bitrate to both participant A and participant B to 500 kb/s. Participant A and participant B will detect that another participant has entered the mesh and may cap the bitrate to participant C to 500 kb/s. They will also renegotiate the connection between themselves and cap the bitrate to 500 kb/s. After this adjustment is complete there is now a peer-to-peer mesh network with three participants, each streaming to one another at a max of 500 kb/s and neither participant consuming more than 1 MB/s, personally. If participant B were to leave the mesh, participant A and participant C can renegotiate their connection and raise the cap back to 1 MB/s so that the quality can go up again.

Figure 11:
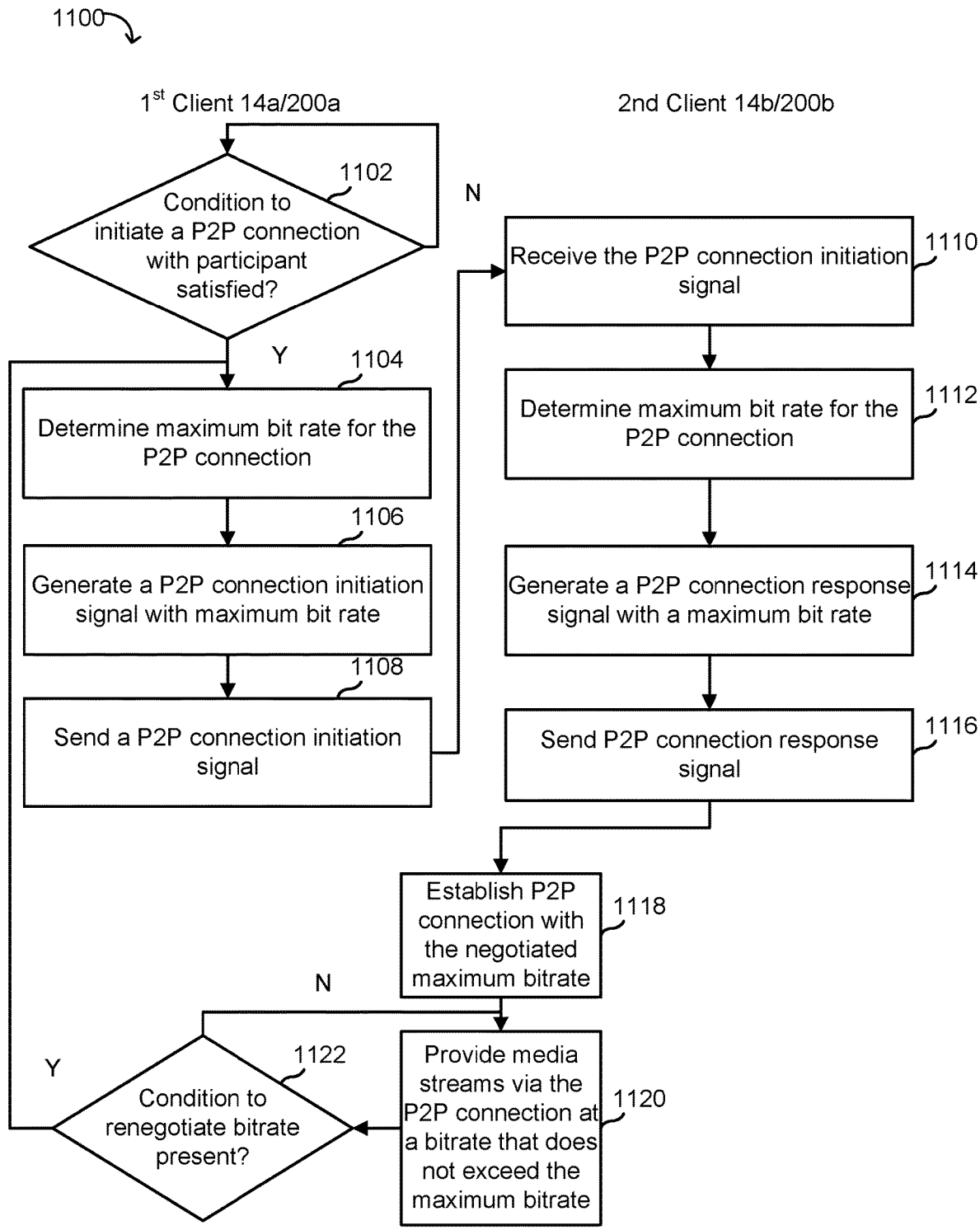
FIG. 11 illustrates a flowchart of a process of peer-to-peer connection bitrate throttling by the computing environment of FIG. 1, in accordance with some embodiments of the present disclosure.

In some embodiments, the server 12, the relay server 16, the clients 14, or the selective forwarding unit server 18 may execute a process 1100 of FIG. 11, for example, by executing program code stored on a tangible, non-transitory, machine-readable medium. The illustrated operations may be executed in a different order, omitted, replicated, executed concurrently, executed serially, have additional operations inserted, all be automated, involve human intervention, or otherwise be modified relative to the arrangement depicted, which is not to suggest that any other description herein is limiting.

In some embodiments, the process 1100 is illustrated in FIG. 11. The process 1100 may begin at decision block 1102 where it is determined whether a peer-to-peer connection condition to initiate a peer-to-peer connection between client computing devices associated with participants is satisfied. In an embodiment, at decision block 1102, the peer-to-peer application 204c of the first client computing device 14a/200a may determine whether a condition is satisfied to establish a peer-to-peer connection with a second client computing device 14b/200b. For example, the peer-to-peer application 204c may determine whether a participant associated with the second client computing device 14b/200b is in proximity (e.g., a predetermined distance, or a distance determined based on the crowdedness of a coordinate grid environment) to a participant associated with the first client computing device 14a/200a. The peer-to-peer application 204c may determine the distances between the participant of the client computing device 14a/200a with other participants in a coordinate grid environment provided by the peer-to-peer application 204c. To do so, the peer-to-peer application 204c may reference the coordinate grid state 216b determined by the client computing device 14a/200a using the process 400 of FIG. 4 described above. While the peer-to-peer connection condition may be based on a proximity or a predetermined distance, other peer-to-peer connection conditions may be contemplated.

The process 1100 may proceed to block 1104 where a maximum bitrate for the peer-to-peer connection with the participant is determined. In an embodiment, at block 1104 the peer-to-peer application controller 204 may determine the maximum bitrate for the peer-to-peer connection. The maximum bitrate for a peer-to-peer connection may be based on the number of peer-to-peer connections that the first client computing device 14a/200a is connected to and a maximum bitrate or the bandwidth of the first client computing device 14a/200a. The maximum bitrate may be set by an administrator for the coordinate grid environment such that a client computing device may have an actual maximum bitrate that is greater than the set maximum bitrate. Specifically, the maximum bitrate for the peer-to-peer connection may be calculated as a function of the maximum bitrate of all peer-to-peer connections established by the client computing device and the number of connections. In one example, the bitrate for the peer-to-peer connection may be the maximum bitrate for the client computing device divided by the number of peer-to-peer connections. However, in other embodiments, as discussed below, may be determined based on the maximum bitrate of connected client computing devices. For example, if participant A has two peer-to-peer connections and a maximum bitrate of 1 mbps, and participant B has four peer-to-peer connections and a maximum bitrate of 1 mbps, then the connection between participant B and participant A will be limited to participant B's bitrate per connection at 250 kbps. As such, the first peer-to-peer connection of participant A's with, for example, participant C may have a bitrate of 750 kbps while the peer-to-peer connection between participant A and participant B will be at the 250 kbps even though participant A could have a 500 kbps bitrate with participant B. In yet other embodiments, the maximum bitrate for a peer-to-peer connection may be calculated based on other factors (e.g., a priority of a particular participant, attributes in the participant state information, or any other factor).

The process 1100 may proceed to block 1106 where a peer-to-peer initiation signal is generated that includes the maximum bitrate for the connection. In an embodiment, at block 1106, the first client computing device 14a/200a may generate a peer-to-peer connection initiation signal that advertises the maximum bitrate that the first client computing device 14a/200a has to offer a second client computing device 14b/200b with which the peer-to-peer connection is to be established. The peer-to-peer connection initiation signal may include a bandwidth or maximum bitrate entry or advertisement. Continuing with the WebRTC example herein, the SDP offer packet that is provided by the first client computing device 14a/200a to the second client computing device 14b/200b to initiate the peer-to-peer connection may include a bandwidth entry that sets the maximum bitrate for the peer-to-peer connection. Typically, the SDP offer maintains a bandwidth that allows the WebRTC to consume as much bandwidth as possible. The peer-to-peer application 204c of the present disclosure may change the contents of the SDP offer such that the maximum bitrate for that peer-to-peer connection is advertised in the bandwidth entry.

The process 1100 may proceed to block 1108 where the first client computing device sends a peer-to-peer connection initiation signal to a second client computing device and the second client computing device receives the peer-to-peer connection initiation signal block 1110. In various embodiments, the first client computing device 14a/200a may determine that it is to be an initiator of peer-to-peer connection with the second client computing device 14b/200b.

For example, the first client computing device 14*a*/200*a* may determine it is the initiator based on its participant identifier and the participant identifier associated with the second client computing device 14*b*/200*b*. Specifically, the first client computing device 14*a*/200*a* may determine that its participant identifier is greater than the participant identifier associated with the second client computing device 14*b*/200*b*, which satisfies a participant identifier condition. However, in other embodiments, the participant identifier that is assigned the lowest participant identifier may be the initiator of the peer-to-peer connection.

As such, the first client computer device 14*a*/200*a* sends the peer-to-peer connection initiation signal to the second client computer device 14*b*/200*b* with the maximum bitrate advertisement for the peer-to-peer connection. For example, the peer-to-peer application 204*c* may communicate with a real-time communication (RTC) application programming interface (API) such as, for example, a WebRTC API. The WebRTC protocol may include the interactive connectivity establishment (ICE) protocol for establishing a peer-to-peer connection. As such, the peer-to-peer initiation signal may include a session description protocol (SDP) offer according to the SDP protocol that includes the maximum bitrate or bandwidth advertisement. More specifically, the SDP protocol may include a video bandwidth advertisement. In various embodiments, the peer-to-peer initiation signal is provided via the network 20 and the relay server 16. For example, the peer-to-peer initiation signal is provided through a persistent connection (e.g., a websocket) established between the first client computing device 14*a*/200*a* and the relay server 16 and a persistent connection established between the second client computing device 14*b*/200*b* and the relay server 16. The second client computing device 14*b*/200*b* may then receive the peer-to-peer initiation signal.

The process 1100 may proceed to block 1112 where the second client computing device determines the maximum bitrate for the peer-to-peer connection. In an embodiment, at block 1112, the second client computing device 14*b*/200*b* may determine its maximum bitrate for the peer-to-peer connection. The second client computing device 14*b*/200*b* may determine its maximum bitrate according to the operations performed by the first client computing device 14*a*/200*a* described at block 1104, and thus are not repeated in detail. In various embodiments, if the maximum bitrate determined by the second client computing device 14*b*/200*b* is greater than the maximum bitrate advertised in the peer-to-peer initiation signal, then the second client computing device 14*b*/200*b* may determine that its maximum bitrate for the peer-to-peer connection is the maximum bitrate that was advertised in the peer-to-peer initiation signal.

The process 1100 may then proceed to block 1114 where the second client computing device generates a peer-to-peer connection response signal with its determined maximum bitrate advertisement. In an embodiment, at block 1114, the second client computing device 14*b*/200*b* may generate the peer-to-peer connection response signal that advertises the maximum bitrate that the second client computing device 14*a*/200*a* has to offer the first client computing device 14*a*/200*a* with which the peer-to-peer connection is to be established. The peer-to-peer connection response signal may include a bandwidth or maximum bitrate entry or advertisement. Continuing with the WebRTC example herein, the SDP answer packet that is provided by the second client computing device 14*b*/200*b* to the first client computing device 14*a*/200*a* to in response to the SDP offer may include a bandwidth entry that sets the maximum bitrate for the peer-to-peer connection. Typically, the SDP answer maintains a bandwidth that allows the WebRTC to consume as much bandwidth as possible. The peer-to-peer application 204*c* of the present disclosure may change the contents of the SDP answer such that the maximum bitrate for that peer-to-peer connection is advertised in the bandwidth entry.

The process 1100 may proceed to block 1116 where the second client computing device sends the peer-to-peer connection response signal. In an embodiment, at block 1116, the second client computing device 14*b*/200*b* may respond to the peer-to-peer connection initiation signal via the relay server 16 with a peer-to-peer connection response signal to the first client computing device 14*a*/200*a*. The first client computing device 14*a*/200*a* may receive the peer-to-peer connection response signal and process the response signal to establish the peer-to-peer connection at block 1118 (e.g., a real-time connection using WebRTC). At block 1120, one or more media streams (e.g., a video stream, an audio stream, an audiovisual stream or other media content stream) may then be provided on that peer-to-peer connection between the first client computing device 14*a*/200*a* and the second client computing device 14*b*/200*b* such that those media streams do not exceed the negotiated maximum bitrate.

The process 1100 may then proceed to decision block 1122 where the first client computing device determines whether a bitrate renegotiation condition is satisfied on the peer-to-peer connection. In an embodiment, at decision block 1122, the first client computing device 14*a*/200*a* may determine whether a bitrate renegotiation condition exists. For example, a bitrate renegotiation condition may be satisfied when the first client computing device 14*a*/200*a* determines it is going to establish a subsequent peer-to-peer connection with another client computing device such that bandwidth needs to be freed up. In another example, the bitrate renegotiation condition may be satisfied when another peer-to-peer connection on the first client computing device 14*a*/200*a* is removed such that further bandwidth can be used on the peer-to-peer connection with second client computing device 14*b*/200*b*. In another embodiment, the bitrate renegotiation condition may be satisfied when a renegotiation signal is received from the second client computing device. In yet other embodiments, other bitrate renegotiation conditions may be monitored that would be apparent to one of skill in the art in possession of the present disclosure.

If the bitrate renegotiation condition does not exist, the process 1100 may continue to provide media streams via the peer-to-peer connection at a bitrate that does not exceed the maximum bitrate at block 1120. If a bitrate renegotiation condition is satisfied at decision block 1122, the first client computing device 14*a*/200*a* may renegotiate the maximum bitrate with the second client computing device 14*b*/200*b*. For example, the first client computing device 14*a*/200*a* may determine the maximum bitrate for the peer-to-peer connection at block 1104 and provide the updated maximum bitrate to the second client computing device 14*b*/200*b* to renegotiate and update the maximum bitrate on both client computing devices. For example, a "negotiationneeded" event may be sent to the peer-to-peer connection (e.g., an RTCPeerConnection) when negotiation of the connection through a signaling channel is required. This may occur both during the initial setup of the peer-to-peer connection as well as any time a change to the communication environment requires reconfiguring the peer-to-peer connection. While decision block 1122 is described from the viewpoint of the first client computing device 14a/200a, the second client computing device 14b/200b may also be monitoring for a bitrate renegotiation signal.

Figure 12B:
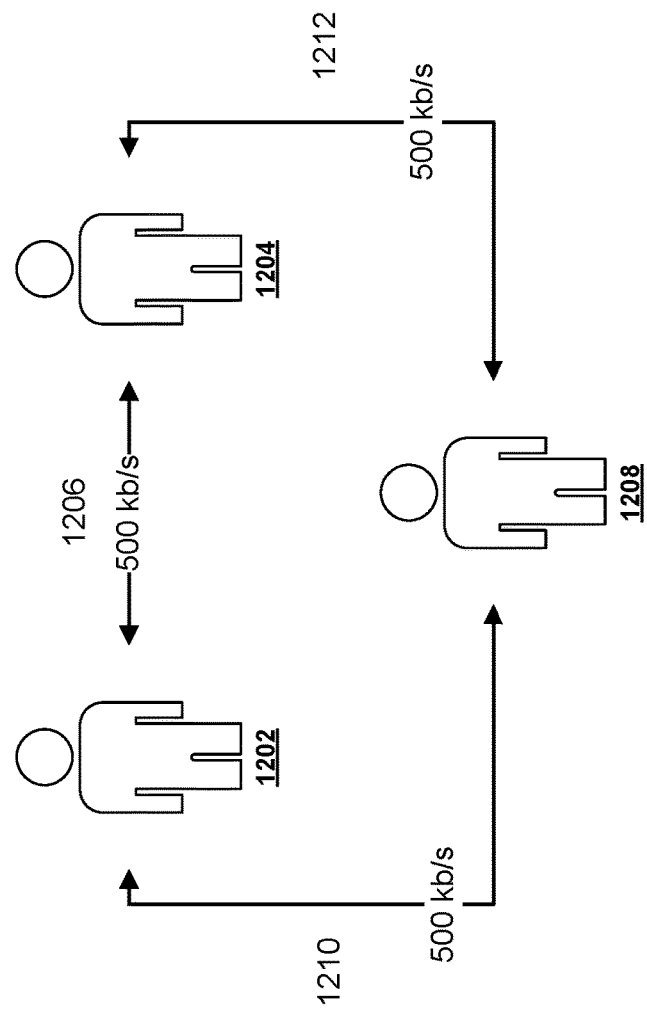
Figure 12C:
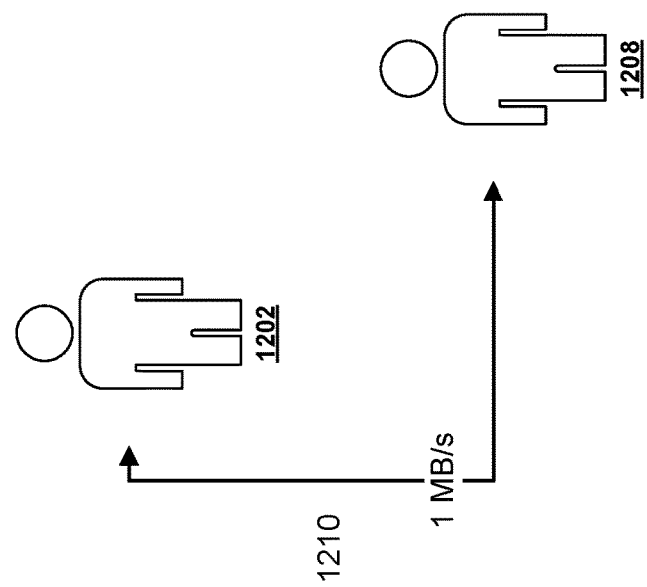

FIG. 12A a coordinate grid environment 1200 with a participant 1202 and a participant 1204. The participant 1202 and the participant 1204 may establish a peer-to-peer connection 1206 when in proximity to each other such that a peer-to-peer connection initiation condition is satisfied that may include any of the operations of the process 500 in FIG. 5. The participant 1202 and the participant 1204 may negotiate a maximum bitrate of 1 mbps, which may be a limit that any client computing device can have in the coordinate grid environment even if the client computing device is configured to have higher bitrate. Subsequently, as illustrated in FIG. 12B, a participant 1208 may enter the coordinate grid environment 1200 such that the participant is able to establish a peer-to-peer connection 1210 with participant 1202 and a peer-to-peer connection 1212 with the participant 1204. The maximum bitrate for the peer-to-peer connection 1206 may be renegotiated to 500 kbps. Also, the peer-to-peer connections 1210 and 1212 may be throttled to 500 kbps. While the example illustrates halving the bitrates when throttling, other apportionments of bitrate may be implemented. FIG. 12C illustrates that participant 1204 has left the mesh network formed by participant 1202, 1204, and 1208 in FIG. 12B such that the peer-to-peer connections 1206 and 1212 no longer exist. Participant 1202 and participant 1208 may renegotiate the maximum bitrate on the peer-to-peer connection 1210 to 1 mbps. As would be appreciated by one of skill in the art in possession of the present disclosure and these examples, as various participants enter and exit the mesh network and form various mesh topology structures, the peer-to-peer connections may be renegotiated throughout the mesh network based on the number of participants and the topology structure of the mesh network.

Thus, systems and method of the present disclosure provide peer-to-peer connection bitrate throttling. When establishing a peer-to-peer connection, the client computing devices advertise a determined maximum bitrate and negotiate the maximum bitrate for that peer-to-peer connection. As participants in a coordinate grid environment enter and exit a mesh network that includes the peer-to-peer connection, the maximum bitrate for that connection may be redetermined and renegotiated by the client computing devices. As such, as the network size grows and shrinks, the bitrate throttling of the present disclosure allows for the quality of the media streams to balance with the quality of the overall experience.

The present patent filing is one of a set of three filed on the same day by the same applicant and members of the set have the following titles: PEER-TO-PEER SIGNAL CACHING SYSTEM; MIXED PEER-TO-PEER MESH AND FORWARDING SYSTEM; CLIENT AUTHORITATIVE STATE DISTRIBUTION SYSTEM. The entire content of each of the patent filings other than this one is hereby incorporated by reference.

FIG. 13 is a diagram that illustrates an exemplary computing system 1300 in accordance with embodiments of the present technique. Various portions of systems and methods described herein, may include or be executed on one or more computer systems similar to computing system 1300. For example, the client computing device 14/200, the server computing devices 12/300, the relay server 16 or the selective forwarding unit 18 may be provided by the computing system 1300 Further, processes and modules described herein may be executed by one or more processing systems similar to that of computing system 1300.

Computing system 1300 may include one or more processors (e.g., processors 1310a-1310n) coupled to system memory 1320, an input/output I/O device interface 1330, and a network interface 1340 via an input/output (I/O) interface 1350. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1300. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1320). Computing system 1300 may be a uni-processor system including one processor (e.g., processor 1310a), or a multi-processor system including any number of suitable processors (e.g., 1310a-1310n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1300 may include a plurality of computing devices (e.g., distributed computer systems) to implement various processing functions.

I/O device interface 1330 may provide an interface for connection of one or more I/O devices 1360 to computer system 1300. I/O devices may include devices that receive input (e.g., from a user) or output information (e.g., to a user). I/O devices 1360 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1360 may be connected to computer system 1300 through a wired or wireless connection. I/O devices 1360 may be connected to computer system 1300 from a remote location. I/O devices 1360 located on remote computer system, for example, may be connected to computer system 1300 via a network and network interface 1340.

Network interface 1340 may include a network adapter that provides for connection of computer system 1300 to a network. Network interface may 1340 may facilitate data exchange between computer system 1300 and other devices connected to the network. Network interface 1340 may support wired or wireless communication. The network may include an electronic communication network, such as the Internet, a local area network (LAN), a wide area network (WAN), a cellular communications network, or the like.

System memory 1320 may be configured to store program instructions 1301 or data 1302. Program instructions 1301 may be executable by a processor (e.g., one or more of processors 1310*a*-1310*n*) to implement one or more embodiments of the present techniques. Instructions 1301 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1320 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1320 may include a non-transitory computer readable storage medium that may have program instructions stored thereon that are executable by a computer processor (e.g., one or more of processors 1310*a*-1310*n*) to cause the subject matter and the functional operations described herein. A memory (e.g., system memory 1320) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1350 may be configured to coordinate I/O traffic between processors 1310*a*-1310*n*, system memory 1320, network interface 1340, I/O devices 1360, and/or other peripheral devices. I/O interface 1350 may perform protocol, timing, or other data transformations to convert data signals from one component (e.g., system memory 1320) into a format suitable for use by another component (e.g., processors 1310*a*-1310*n*). I/O interface 1350 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1300 or multiple computer systems 1300 configured to host different portions or instances of embodiments. Multiple computer systems 1300 may provide for parallel or sequential processing/execution of one or more portions of the techniques described herein.

Those skilled in the art will appreciate that computer system 1300 is merely illustrative and is not intended to limit the scope of the techniques described herein. Computer system 1300 may include any combination of devices or software that may perform or otherwise provide for the performance of the techniques described herein. For example, computer system 1300 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1300 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: establishing, with a first client computing device, a first peer-to-peer connection with a second client computing device; determining, with the first client computing device, that a first media stream provided by the first client computing device satisfies at least one selective forwarding unit streaming condition; and providing, with the first client computing device and in response to the first media stream satisfying the at least one selective forwarding unit streaming condition, the first media stream to the second client computing device via a selective forwarding unit.

2. The medium of embodiment 1, wherein the operations further comprise: determining that a second media stream provided by the second client computing device does not satisfy the at least one selective forwarding unit streaming condition; and providing, in response to the second media stream of content provided by the second client computing device not satisfying the at least one selective forwarding unit streaming condition, the second media stream from the second client computing device to the first client computing device via the first peer-to-peer connection.

3. The medium of any one of embodiments 1-2, wherein a selective forwarding unit streaming condition of the at least one selective forwarding unit streaming condition includes a participant stream access threshold.

4. The medium of embodiment 3, wherein the operations further comprise: entering a broadcast state when a number of participants that is to receive the first media stream exceeds the participant stream access threshold, wherein the broadcast state causes the first client computing device to provide the first media stream to the selective forwarding unit.

5. The medium of any one of embodiments 1-4, wherein the at least one selective forwarding unit streaming condition includes a content stream quality threshold.

6. The medium of embodiment 5, wherein the operations further comprise: entering a screen share state when a quality of the first media stream exceeds the content stream quality threshold, wherein the screen share state causes the first client computing device to provide the first media stream to the selective forwarding unit.

7. The medium of any one of embodiments 1-6, further comprising: entering, with the first client computing device in response to determining that the first media stream provided by the first client computing device satisfies the at least one selective forwarding unit streaming condition, a communication state for a first participant associated with the first client computing device that includes a broadcasting state or a screen share state; and providing, with the first client computing device, participant state information that includes the communication state to the second client computing device or any other one or more client computing devices associated with a participant in a coordinate grid environment.

8. The medium of embodiment 7, wherein the providing the participant state information that includes the communication state to the second client computing device or any other one or more client computing devices associated with a participant in the coordinate grid environment includes providing the participant state information via the first peer-to-peer connection or other peer-to-peer connections.

9. The medium of embodiment 7, wherein the providing the participant state information that includes the communication state to the second client computing device or any other one or more client computing devices associated with a participant in the coordinate grid environment includes providing the participant state information via a state server computing device.

10. The medium of any one of embodiments 1-9, wherein the operations further comprise: determining, with the first client computing device and after completion of the first media stream, that a second media stream provided by the first client computing device does not satisfy the at least one selective forwarding unit streaming condition; and providing, with the first client computing device and in response to the second media stream not satisfying the at least one selective forwarding unit streaming condition, the second media stream to the second client computing device via the first peer-to-peer connection.

11. The medium of embodiment 10, wherein the operations further comprise: entering, with the first client computing device in response to determining that the second media stream provided by the first client computing device does not satisfy the at least one selective forwarding unit streaming condition, a communication state that includes a base state for a first participant that is associated with the first client computing device; and providing, with the first client computing device, participant state information that includes the communication state to the second client computing device or any other one or more client computing devices associated with a participant in a coordinate grid environment.

12. The medium of any one of embodiments 1-11, wherein the operations further comprise: determining, with the first client computing device, that the second client computing device is providing media streaming via the selective forwarding unit; and obtaining, with the first client computing device, a second media stream from the second client computing device via the selective forwarding unit.

13. The medium of embodiment 12, wherein the determining that the second client computing device is providing the media streaming via the selective forwarding unit is based on participant state information that includes a communication state for the second client computing device.

14. The medium of embodiment 13, wherein the operations further comprise: receiving, by the first client computing device via a state server computing device or the first peer-to-peer connection, a participant state information update from the second client computing device that includes a communication state update for the second client computing device from providing media streams on the selective forwarding unit to the first peer-to-peer connection; updating, by the first client computing device, the participant state information maintained by the first client computing device; monitoring, by the first client computing device, the first peer-to-peer connection for media streams and not monitoring a connection with the selective forwarding unit for media streams from the second client computing device; and obtaining, by the first client computing device, a third media stream from the second client computing device via the first peer-to-peer connection.

15. The medium of any one of embodiments 1-14, wherein the operations further comprise: determining, with the first client computing device, that the second client computing device is providing media streams via the first peer-to-peer connection; and obtaining, with the first client computing device, a second media stream from the second client computing device via the first peer-to-peer connection.

16. The medium of embodiment 15, wherein the operations further comprise: establishing, with the first client computing device, a second peer-to-peer connection with a third client computing device; determining, with the first client computing device, that the third client computing device is providing media streaming via the selective forwarding unit; and obtaining, with the first client computing device, a third media stream from the third client computing device via the selective forwarding unit.

17. The medium of embodiment 16, wherein at least a portion of the third media stream and at least a portion of the second media stream are being received by the first client computing device concurrently.

18. The medium of any one of embodiments 1-17, wherein the operations further comprise: receiving, by the first client computing device, a peer-to-peer connection initiation signal to establish the first peer-to-peer connection with the second client computing device; determining, by the first client computing device, that a peer-to-peer connection condition exists for the first client computing device such that the first client computing device is available to establish the first peer-to-peer connection with the second client computing device; processing, by the first client computing device, the peer-to-peer connection initiation signal; and sending, by the first client computing device, a peer-to-peer connection response signal to the peer-to-peer connection initiation signal to the second client computing device, wherein the peer-to-peer connection response signal causes the first client computing device and the second client computing device to establish the first peer-to-peer connection.

19. The medium of embodiment 18, wherein the operations further comprise: obtaining, by the first client computing device, the peer-to-peer connection initiation signal from a signal cache associated with the first client computing device, wherein the peer-to-peer connection initiation signal was stored in the signal cache when the first client computing device determined that the peer-to-peer connection condition was not satisfied.

22. A system, comprising: one or more processors; and one or more computer readable media storing instructions that when executed by the one or more processors effectuate operations comprising: the operations of any one of embodiments 1-19.

23. A method, comprising: the operations of any one of embodiments 1-19.

What is claimed is:

1. A non-transitory, machine-readable medium storing instructions that, when executed by one or more processors, effectuate operations comprising:
    establishing, with a first client computing device, a first peer-to-peer connection with a second client computing device;
    determining, with the first client computing device, that the second client computing device is providing media streaming via a selective forwarding unit, wherein the determining that the second client computing device is providing the media streaming via the selective forwarding unit is based on participant state information that includes a communication state for the second client computing device;
    obtaining, with the first client computing device, a first media stream from the second client computing device via the selective forwarding unit;
    receiving, by the first client computing device via a state server computing device or the first peer-to-peer connection, a participant state information update from the second client computing device that includes a communication state update for the second client computing device from providing media streams on the selective forwarding unit to the first peer-to-peer connection;
    updating, by the first client computing device, the participant state information maintained by the first client computing device;
    monitoring, by the first client computing device, the first peer-to-peer connection for media streams and not monitoring a connection with the selective forwarding unit for media streams from the second client computing device; and
    obtaining, by the first client computing device, a second media stream from the second client computing device via the first peer-to-peer connection.

2. The medium of claim 1, wherein the operations further comprise:
    determining, with the first client computing device, that a third media stream provided by the first client computing device satisfies at least one selective forwarding unit streaming condition; and
    providing, with the first client computing device and in response to the third media stream satisfying the at least one selective forwarding unit streaming condition, the first media stream to the second client computing device via the selective forwarding unit.

3. The medium of claim 2, wherein a selective forwarding unit streaming condition of the at least one selective forwarding unit streaming condition includes a participant stream access threshold.

4. The medium of claim 3, wherein the operations further comprise:
    entering a broadcast state when a number of participants that is to receive the third media stream exceeds the participant stream access threshold, wherein the broadcast state causes the first client computing device to provide the third media stream to the selective forwarding unit.

5. The medium of claim 2, wherein the at least one selective forwarding unit streaming condition includes a content stream quality threshold.

6. The medium of claim 5, wherein the operations further comprise:
entering a screen share state when a quality of the third media stream exceeds the content stream quality threshold, wherein the screen share state causes the first client computing device to provide the third media stream to the selective forwarding unit.

7. The medium of claim 2, further comprising:
entering, with the first client computing device in response to determining that the third media stream provided by the first client computing device satisfies the at least one selective forwarding unit streaming condition, a communication state for a first participant associated with the first client computing device that includes a broadcasting state or a screen share state; and
providing, with the first client computing device, second participant state information that includes the communication state to the second client computing device or any other one or more client computing devices associated with a participant in a coordinate grid environment.

8. The medium of claim 7, wherein the providing the participant state information that includes the communication state to the second client computing device or any other one or more client computing devices associated with a participant in the coordinate grid environment includes providing the participant state information via the first peer-to-peer connection or other peer-to-peer connections.

9. The medium of claim 7, wherein the providing the participant state information that includes the communication state to the second client computing device or any other one or more client computing devices associated with a participant in the coordinate grid environment includes providing the participant state information via the state server computing device.

10. The medium of claim 2, wherein the operations further comprise:
determining, with the first client computing device and after completion of the third media stream, that a fourth media stream provided by the first client computing device does not satisfy the at least one selective forwarding unit streaming condition; and
providing, with the first client computing device and in response to the fourth media stream not satisfying the at least one selective forwarding unit streaming condition, the second media stream to the second client computing device via the first peer-to-peer connection.

11. The medium of claim 10, wherein the operations further comprise:
entering, with the first client computing device in response to determining that the fourth media stream provided by the first client computing device does not satisfy the at least one selective forwarding unit streaming condition, a communication state that includes a base state for a first participant that is associated with the first client computing device; and
providing, with the first client computing device, second participant state information that includes the communication state to the second client computing device or any other one or more client computing devices associated with a participant in a coordinate grid environment.

12. The medium of claim 1, wherein the operations further comprise:
establishing, with the first client computing device, a second peer-to-peer connection with a third client computing device;
determining, with the first client computing device, that the third client computing device is providing media streaming via the selective forwarding unit; and
obtaining, with the first client computing device, a third media stream from the third client computing device via the selective forwarding unit.

13. The medium of claim 12, wherein at least a portion of the third media stream and at least a portion of the second media stream are being received by the first computing device concurrently.

14. The medium of claim 1, wherein the operations further comprise: receiving, by the first client computing device, a peer-to-peer connection initiation signal to establish the first peer-to-peer connection with the second client computing device;
determining, by the first client computing device, that a peer-to-peer connection condition exists for the first client computing device such that the first client computing device is available to establish the first peer-to-peer connection with the second client computing device;
processing, by the first client computing device, the peer-to-peer connection initiation signal; and
sending, by the first client computing device, a peer-to-peer connection response signal to the peer-to-peer connection initiation signal to the second client computing device, wherein the peer-to-peer connection response signal causes the first client computing device and the second client computing device to establish the first peer-to-peer connection.

15. The medium of claim 14, wherein the operations further comprise:
obtaining, by the first client computing device, the peer-to-peer connection initiation signal from a signal cache associated with the first client computing device, wherein the peer-to-peer connection initiation signal was stored in the signal cache when the first client computing device determined that the peer-to-peer connection condition was not satisfied.

16. A method, comprising:
establishing, with a first client computing device, a first peer-to-peer connection with a second client computing device;
determining, with the first client computing device, that the second client computing device is providing media streaming via a selective forwarding unit, wherein the determining that the second client computing device is providing the media streaming via the selective forwarding unit is based on participant state information that includes a communication state for the second client computing device;
obtaining, with the first client computing device, a first media stream from the second client computing device via the selective forwarding unit;
receiving, by the first client computing device via a state server computing device or the first peer-to-peer connection, a participant state information update from the second client computing device that includes a communication state update for the second client computing device from providing media streams on the selective forwarding unit to the first peer-to-peer connection;

updating, by the first client computing device, the participant state information maintained by the first client computing device;

monitoring, by the first client computing device, the first peer-to-peer connection for media streams and not monitoring a connection with the selective forwarding unit for media streams from the second client computing device; and obtaining, by the first client computing device, a second media stream from the second client computing device via the first peer-to-peer connection.

17. The method of claim 16, further comprising:

determining, with the first client computing device, that a third media stream provided by the first client computing device satisfies at least one selective forwarding unit streaming condition; and providing, with the first client computing device and in response to the third media stream satisfying the at least one selective forwarding unit streaming condition, the first media stream to the second client computing device via the selective forwarding unit.

18. The method of claim 17, further comprising:

determining, with the first client computing device and after completion of the third media stream, that a fourth media stream provided by the first client computing device does not satisfy the at least one selective forwarding unit streaming condition; and providing, with the first client computing device and in response to the fourth media stream not satisfying the at least one selective forwarding unit streaming condition, the second media stream to the second client computing device via the first peer-to-peer connection.

19. The method of claim 18, further comprising:

entering, with the first client computing device in response to determining that the fourth media stream provided by the first client computing device does not satisfy the at least one selective forwarding unit streaming condition, a communication state that includes a base state for a first participant that is associated with the first client computing device; and providing, with the first client computing device, second participant state information that includes the communication state to the second client computing device or any other one or more client computing devices associated with a participant in a coordinate grid environment.

20. The method of claim 16, further comprising:

establishing, with the first client computing device, a second peer-to-peer connection with a third client computing device;

determining, with the first client computing device, that the third client computing device is providing media streaming via the selective forwarding unit; and obtaining, with the first client computing device, a third media stream from the third client computing device via the selective forwarding unit.

* * * * *